US012563331B2

(12) United States Patent
Toma et al.

(10) Patent No.: US 12,563,331 B2
(45) Date of Patent: Feb. 24, 2026

(54) IN-CANAL HEARING DEVICE INCLUDING SEALED VIBRATORY TRANSDUCER

(71) Applicant: STARKEY LABORATORIES, INC., Eden Prairie, MN (US)

(72) Inventors: Emil Toma, Stockport (GB); Adrian Pirvu, Chanhassen, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 428 days.

(21) Appl. No.: 18/124,365

(22) Filed: Mar. 21, 2023

(65) Prior Publication Data

US 2023/0319453 A1 Oct. 5, 2023

Related U.S. Application Data

(60) Provisional application No. 63/325,218, filed on Mar. 30, 2022.

(51) Int. Cl.

| | |
|---|---|
| ***H04R 1/10*** | (2006.01) |
| ***H04R 1/02*** | (2006.01) |
| ***H04R 1/28*** | (2006.01) |

(52) U.S. Cl.

CPC ............ *H04R 1/1016* (2013.01); *H04R 1/02* (2013.01); *H04R 1/2807* (2013.01)

(58) Field of Classification Search

CPC ...... H04R 1/1016; H04R 1/02; H04R 1/2807; H04R 1/1075; H04R 9/06; H04R 9/045; H04R 2460/13; H04R 11/02; H04R 25/604; H04R 3/08; H04R 2400/03; H04R 25/456; H04R 1/2849; H04R 1/2842; H04R 1/1041; H04R 25/603; H04R 2460/11

USPC .............................................. 381/381, 151

See application file for complete search history.

(56) References Cited

U.S. PATENT DOCUMENTS

| | | | | |
|---|---|---|---|---|
| 5,498,226 | A | 3/1996 | Lenkauskas | |
| 10,091,594 | B2 * | 10/2018 | Gustafsson | H04R 25/606 |
| 10,237,663 | B2 * | 3/2019 | Puria | H04R 25/554 |
| 10,284,968 | B2 * | 5/2019 | Van Dijk | H04R 25/305 |
| 2006/0262954 | A1 * | 11/2006 | Lee | H04M 1/03 381/380 |

(Continued)

FOREIGN PATENT DOCUMENTS

WO WO 2010090395 A2 8/2010

OTHER PUBLICATIONS

Sonion, "Miniature magnetic receiver (balanced armature type) for use in hearing aids", Data Sheet, Receiver 37AM007M, May 20, 2011, 3 pages.

*Primary Examiner* — Carolyn R Edwards
*Assistant Examiner* — Julie X Dang
(74) *Attorney, Agent, or Firm* — Mueting Raasch Group

(57) ABSTRACT

An ear-wearable electronic device comprises a housing configured for deployment at least partially within an ear canal of a wearer, sound processing circuitry, and a vibratory transducer disposed in the housing and coupled to the sound processing circuitry. The vibratory transducer comprises an oscillator arrangement disposed in a sealed case. The vibratory transducer is configured to generate output signals in the form of audible sound transmissible via air conduction to an eardrum of the wearer and vibratory signals for stimulating a cochlea of the wearer via transcranial bone conduction.

22 Claims, 14 Drawing Sheets

(56) References Cited

U.S. PATENT DOCUMENTS

| | | | | |
|---|---|---|---|---|
| 2007/0036378 | A1* | 2/2007 | Saltykov | H04R 25/604<br>381/324 |
| 2007/0237347 | A1 | 10/2007 | Pfeiler | |
| 2013/0156202 | A1 | 6/2013 | Hamacher | |
| 2014/0023212 | A1* | 1/2014 | Herscher | H04R 25/407<br>381/313 |
| 2014/0364681 | A1* | 12/2014 | Hillbratt | H04R 25/453<br>600/25 |
| 2015/0264473 | A1* | 9/2015 | Fukuda | H04R 1/46<br>381/151 |
| 2020/0178003 | A1 | 6/2020 | Zurbruegg et al. | |
| 2021/0322764 | A1* | 10/2021 | Mauger | H04R 25/554 |
| 2021/0329378 | A1* | 10/2021 | Zhang | H04R 9/025 |
| 2022/0386021 | A1* | 12/2022 | Zhang | H04R 1/105 |

* cited by examiner

IN-CANAL HEARING DEVICE INCLUDING SEALED VIBRATORY TRANSDUCER

RELATED APPLICATIONS

This application claims the benefit of U.S. Provisional Application No. 63/325,218, filed Mar. 30, 2022, the content of which is hereby incorporated herein by reference.

TECHNICAL FIELD

This application relates generally to hearing devices deployable at least partially in an ear canal, such devices including hearing aid, hearables, earbuds, personal amplification devices, and other devices that generate signals that are transformed into sound.

SUMMARY

Embodiments are directed to an ear-wearable electronic device comprising a housing configured for deployment at least partially within an ear canal of a wearer, sound processing circuitry, and a vibratory transducer disposed in the housing and coupled to the sound processing circuitry. The vibratory transducer comprises an oscillator arrangement disposed in a sealed case. The vibratory transducer is configured to generate output signals in the form of audible sound transmissible via air conduction to an eardrum of the wearer and vibratory signals for stimulating a cochlea of the wearer via transcranial bone conduction.

Embodiments are directed to a method implemented by an ear-wearable electronic device. The method comprises receiving or generating electrical signals indicative of sound, and generating, by an in-canal vibratory transducer and in response to the electrical signals, output signals in the form of audible sound transmissible via air conduction to an ear drum and vibratory signals for stimulating a cochlea via transcranial bone conduction.

Embodiments are directed to an ear-wearable electronic device comprising a housing configured for deployment at least partially within an ear canal of a wearer, sound processing circuitry, and a vibratory transducer disposed in the housing and coupled to the sound processing circuitry. The vibratory transducer comprises a sealed case and an oscillator arrangement disposed in the sealed case. The oscillator arrangement comprises a magnet arrangement comprising a first magnet and a second magnet spaced apart from the first magnet, a coil arrangement comprising a main coil, a weight ballast, and an armature positioned between the first and second magnets and passing through the main coil. The armature comprises a first end connected to the sealed case at a hard joint and a second end connected to the weight ballast. The oscillator arrangement is suspended by the armature at the hard joint.

Embodiments are directed to an ear-wearable electronic device comprising a housing configured for deployment at least partially within an ear canal of a wearer, sound processing circuitry, and a vibratory transducer disposed in the housing and coupled to the sound processing circuitry. The vibratory transducer comprises a sealed case and a radial oscillator arrangement disposed in the sealed case. The radial oscillator arrangement comprises a rotor comprising a coil wrapped around a ferromagnetic core and a stator comprising first and second magnets respectively connected to first and second holding plates. The rotor is disposed between the first and second magnets. A pair of axles extend from the rotor and are positioned along an axis of the rotor.

Each of the axles pass through holes provided in the coil and the holding plates and terminate at respective hard joints disposed at opposing faces of the sealed case.

Embodiments are directed to an ear-wearable electronic device comprising a housing configured for deployment at least partially within an ear canal of a wearer, sound processing circuitry, and a vibratory transducer disposed in the housing and coupled to the sound processing circuitry. The vibratory transducer comprises a sealed case and a swing oscillator arrangement disposed in the sealed case. The swing oscillator arrangement comprises a rotor comprising a bipolar rotor magnet, a first holding plate connected to a first surface of the rotor magnet, and a second holding plate connected to a second surface of the rotor magnet opposing the first surface of the rotor magnet. The swing oscillator arrangement also comprises a first elongated arm connected to the first holding plate and extending out of the rotor and terminating at a first hard joint disposed on a face of the sealed housing. The swing oscillator arrangement further comprises a second elongated arm connected to the second holding plate and extending out of the rotor and terminating at a second hard joint disposed on the face of the sealed housing. The swing oscillator arrangement also comprises a stator comprising a first ferromagnetic stator core and a second ferromagnetic stator core, a first coil wrapped around the first stator core and a second coil wrapped around the second stator core. The first and second holding plates are respectively connected to the first and second stator cores and form an aperture through which the first and second elongated arms can pass.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
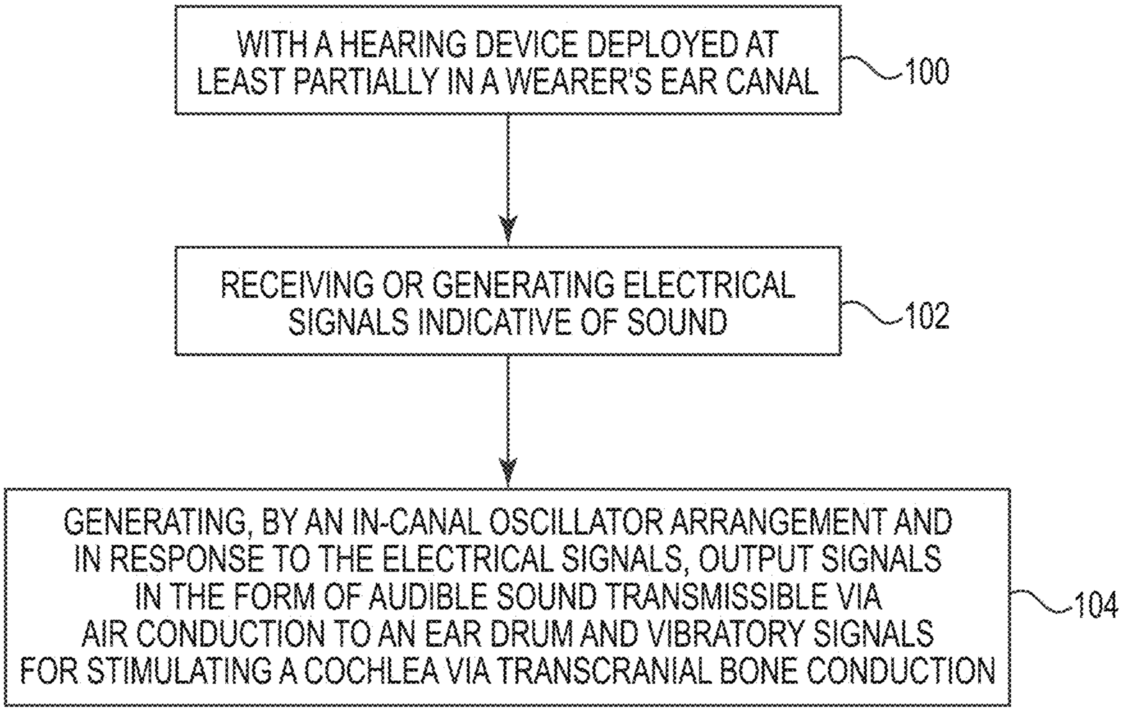
FIG. 1 illustrates a method implemented by an ear-wearable electronic device in accordance with any of the embodiments disclosed herein.

Embodiments of an ear-wearable electronic device as disclosed herein can constitute a hybrid hearing device configured to facilitate hearing of audible sounds via output signals communicated through disparate physiologic pathways and transmission mechanisms. Embodiments of the disclosure are directed to an ear-wearable electronic device which includes a vibratory transducer comprising an in-canal oscillator arrangement. The vibratory transducer is essentially maintenance free, in that it is spoutless (does not have an output sound port or sound outlet) and can be enclosed in an airtight case. As such, the vibratory transducer is impervious to ear discharge, ear wax, liquid, oil, and dust ingression. In some implementations, the in-canal oscillator arrangement comprises an orthogonal oscillator arrangement. In other implementations, the in-canal oscillator arrangement comprises a radial oscillator arrangement. In further implementations, the in-canal oscillator arrangement comprises a swing oscillator arrangement.

Embodiments of the disclosure are defined in the claims. However, below there is provided a non-exhaustive listing of non-limiting examples. Any one or more of the features of these examples may be combined with any one or more features of another example, embodiment, or aspect described herein.

Example Ex1. An ear-wearable electronic device comprises a housing configured for deployment at least partially within an ear canal of a wearer, sound processing circuitry, and a vibratory transducer disposed in the housing and coupled to the sound processing circuitry. The vibratory transducer comprises an oscillator arrangement disposed in a sealed case. The vibratory transducer is configured to generate output signals in the form of audible sound transmissible via air conduction to an ear drum of the wearer and vibratory signals for stimulating a cochlea of the wearer via transcranial bone conduction.

Example Ex2. The device according to Ex1, wherein the sealed case of the oscillator arrangement is devoid of a sound output port.

Example Ex3. The device according to Ex1 or Ex2, wherein the sealed case of the oscillator arrangement is airtight.

Example Ex4. The device according to one or more of Ex1 to Ex3, wherein the oscillator arrangement is impervious to ear discharge, earwax, liquid, oil, and dust ingression.

Example Ex5. The device according to one or more of Ex1 to Ex4, wherein the housing is configured as an in-canal receiver of a receiver-in-canal (RIC) hearing device.

Example Ex6. The device according to one or more of Ex1 to Ex4, wherein the housing is configured as an invisible-in-canal (IIC), completely-in-canal (CIC), in-the-canal (ITC) or in-the-ear (ITE) hearing device.

Example Ex7. The device according to one or more of Ex1 to Ex6, wherein the vibratory transducer is configured to generate output signals having frequencies of up to at least 20 kHz.

Example Ex8. The device according to one or more of Ex1 to Ex7, wherein the oscillator arrangement has a resonance frequency lower than frequencies of the output signals generated by the vibratory transducer.

Example Ex9. The device according to one or more of Ex1 to Ex8, comprising an electronic hardware platform disposed in the sealed case, and one or more sensors disposed in or on the sealed case and coupled to the electronic hardware platform.

Example Ex10. The device according to one or more of Ex1 to Ex9, comprising an electronic hardware platform disposed in the sealed case, and one or more sensors disposed in or on the housing and coupled to the electronic hardware platform via sealed access ports of the sealed case.

Example Ex11. The device according to one or more of Ex1 to Ex10, wherein the oscillator arrangement comprises an orthogonal oscillator arrangement.

Example Ex12. The device according to one or more of Ex1 to Ex10, wherein the oscillator arrangement comprises a radial oscillator arrangement.

Example Ex13. The device according to one or more of Ex1 to Ex10, wherein the oscillator arrangement comprises a swing oscillator arrangement.

Example Ex14. An ear-wearable electronic device comprises a housing configured for deployment at least partially within an ear canal of a wearer, sound processing circuitry, and a vibratory transducer disposed in the housing and coupled to the sound processing circuitry. The vibratory transducer comprises a sealed case and an oscillator arrangement disposed in the sealed case. The oscillator arrangement comprises a magnet arrangement comprising a first magnet and a second magnet spaced apart from the first magnet, a coil arrangement comprising a main coil, a weight ballast, and an armature positioned between the first and second magnets and passing through the main coil. The armature comprises a first end connected to the sealed case at a hard joint and a second end connected to the weight ballast. The oscillator arrangement is suspended by the armature at the hard joint.

Example Ex15. The device according to Ex14, wherein the oscillator arrangement is mechanically isolated from the sealed case except at the hard joint.

Example Ex16. The device according to Ex14 or Ex15, wherein a frequency response of the oscillator arrangement is dependent on a mass of the weight ballast and a length or a shape of the armature.

Example Ex17. The device according to one or more of Ex14 to Ex16, wherein the armature has one of an L-shape, a zig-zag shape, a spiral shape, a U-shape, and a meandering shape.

Example Ex18. The device according to one or more of Ex14 to Ex17, wherein the main coil is operably coupled to a driver of the sound processing circuitry, and the coil arrangement comprises a control coil configured to dampen undesired frequencies.

Example Ex19. The device according to one or more of Ex14 to Ex18, wherein the armature is configured to receive induced magnetic currents of opposite phases which cancel or attenuate each other and of which a resultant magnetic field interacts with magnetic fields from the first and second magnets.

Example Ex20. The device according to one or more of Ex14 to Ex19, wherein the housing comprises a distal end and an opposing proximal end, the distal end directed to an ear drum of the wearer when the device is deployed in the wearer's ear canal, and solid material encompasses the sealed case and is disposed between the sealed case and the distal end of the housing.

Example Ex21. The device according to one or more of Ex14 to Ex20, wherein the vibratory transducer is configured to generate output signals in the form of audible sound transmissible via air conduction to an ear drum of the wearer and vibratory signals for stimulating a cochlea of the wearer via transcranial bone conduction.

Example Ex22. The device according to one or more of Ex14 to Ex21, wherein the sealed case of the oscillator arrangement is airtight and devoid of a sound output port.

Example Ex23. The device according to one or more of Ex14 to Ex22, wherein the oscillator arrangement is impervious to ear discharge, earwax, liquid, oil, and dust ingression.

Example Ex24. The device according to one or more of Ex14 to Ex23, wherein the housing is configured as an in-canal receiver of a receiver-in-canal (RIC) hearing device.

Example Ex25. The device according to one or more of Ex14 to Ex23, wherein the housing is configured as an invisible-in-canal (IIC), completely-in-canal (CIC), in-the-canal (ITC) or in-the-ear (ITE) hearing device.

Example Ex26. The device according to one or more of Ex14 to Ex25, wherein the vibratory transducer is configured to generate output signals having frequencies of up to at least 20 kHz.

Example Ex27. A method implemented by an ear-wearable electronic device comprises receiving or generating electrical signals indicative of sound, and generating, by an in-canal vibratory transducer and in response to the electrical signals, output signals in the form of audible sound transmissible via air conduction to an ear drum and vibratory signals for stimulating a cochlea via transcranial bone conduction.

Example Ex28. The method according to Ex27, comprising suspending an oscillator arrangement of the in-canal vibratory transducer from a wall of a sealed case within which the in-canal vibratory transducer is disposed.

Example Ex29. The method according to Ex27 or Ex28, wherein the in-canal vibratory transducer generates the output signals from within a sealed case devoid of a sound output port.

Example Ex 30. The method according to Ex27 to Ex29, wherein the in-canal vibratory transducer is impervious to ear discharge, earwax, liquid, oil, and dust ingression.

Example Ex 31. The method according to one or more of Ex27 to Ex30, wherein the in-canal vibratory transducer is disposed in a housing configured as an in-canal receiver of a receiver-in-canal (MC) hearing device.

Example Ex 32. The method according to one or more of Ex27 to Ex30, wherein the in-canal vibratory transducer is disposed in a housing configured as an invisible-in-canal (IIC), completely-in-canal (CIC), in-the-canal (ITC) or in-the-ear (ITE) hearing device.

Example Ex33. The method according to one or more of Ex27 to Ex32, wherein the in-canal vibratory transducer is configured to generate output signals having frequencies of up to at least 20 kHz.

Example Ex34. An ear-wearable electronic device comprising a housing configured for deployment at least partially within an ear canal of a wearer, sound processing circuitry, and a vibratory transducer disposed in the housing and coupled to the sound processing circuitry. The vibratory transducer comprises a sealed case and a radial oscillator arrangement disposed in the sealed case. The radial oscillator arrangement comprises a rotor comprising a coil wrapped around a ferromagnetic core and a stator comprising first and second magnets respectively connected to first and second holding plates. The rotor is disposed between the first and second magnets. A pair of axles extend from the rotor and are positioned along an axis of the rotor. Each of the axles pass through holes provided in the coil and the holding plates and terminate at respective hard joints disposed at opposing faces of the sealed case.

Example Ex35. The device according to Ex34, comprising a pair of spring arrangements each comprising a watch spring connected to one of the axles and one of the holding plates, the pair of watch springs wound opposite to one another such that the rotor rests aligned with the first and second magnets when the radial oscillator arrangement is not powered.

Example Ex36. The device according to Ex34 or Ex35, wherein the radial oscillator arrangement is mechanically isolated from the sealed case except at the hard joints.

Example Ex37. The device according to one or more of Ex34 to Ex36, wherein the housing comprises a distal end and an opposing proximal end, the distal end directed to an ear drum of the wearer when the device is deployed in the wearer's ear canal, and solid material encompasses the sealed case and is disposed between the sealed case and the distal end of the housing.

Example Ex38. The device according to one or more of Ex34 to Ex37, wherein the vibratory transducer is configured to generate output signals in the form of audible sound transmissible via air conduction to an ear drum of the wearer and vibratory signals for stimulating a cochlea of the wearer via transcranial bone conduction.

Example Ex39. The device according to one or more of Ex34 to Ex38, wherein the sealed case of the oscillator arrangement is airtight and devoid of a sound output port.

Example Ex40. The device according to one or more of Ex34 to Ex39, wherein the oscillator arrangement is impervious to ear discharge, earwax, liquid, oil, and dust ingression.

Example Ex41. The device according to one or more of Ex34 to Ex40, wherein the housing is configured as an in-canal receiver of a receiver-in-canal (RIC) hearing device.

Example Ex42. The device according to one or more of Ex34 to Ex40, wherein the housing is configured as an invisible-in-canal (IIC), completely-in-canal (CIC), in-the-canal (ITC) or in-the-ear (ITE) hearing device.

Example Ex43. The device according to one or more of Ex34 to Ex42, wherein the vibratory transducer is configured to generate output signals having frequencies of up to at least 20 kHz.

Example Ex44. An ear-wearable electronic device comprises a housing configured for deployment at least partially within an ear canal of a wearer, sound processing circuitry, and a vibratory transducer disposed in the housing and coupled to the sound processing circuitry. The vibratory transducer comprises a sealed case and a swing oscillator arrangement disposed in the sealed case. The swing oscillator arrangement comprises a rotor comprising a bipolar rotor magnet, a first holding plate connected to a first surface of the rotor magnet, and a second holding plate connected to a second surface of the rotor magnet opposing the first surface of the rotor magnet. The swing oscillator arrangement also comprises a first elongated arm connected to the first holding plate and extending out of the rotor and terminating at a first hard joint disposed on a face of the sealed housing. The swing oscillator arrangement further comprises a second elongated arm connected to the second holding plate and extending out of the rotor and terminating at a second hard joint disposed on the face of the sealed housing. The swing oscillator arrangement also comprises a stator comprising a first ferromagnetic stator core and a second ferromagnetic stator core, a first coil wrapped around the first stator core and a second coil wrapped around the second stator core. The first and second holding plates are respectively connected to the first and second stator cores and form an aperture through which the first and second elongated arms can pass.

Example Ex45. The device according to Ex44, wherein the swing oscillator arrangement is mechanically isolated from the sealed case except at the hard joints.

Example Ex46. The device according to Ex44 or Ex45, wherein the housing comprises a distal end and an opposing proximal end, the distal end directed to an ear drum of the wearer when the device is deployed in the wearer's ear canal, and solid material encompasses the sealed case and is disposed between the sealed case and the distal end of the housing.

Example Ex47. The device according to one or more of Ex44 to Ex46, wherein the vibratory transducer is configured to generate output signals in the form of audible sound transmissible via air conduction to an ear drum of the wearer and vibratory signals for stimulating a cochlea of the wearer via transcranial bone conduction.

Example Ex48. The device according to one or more of Ex44 to Ex47, wherein the sealed case of the oscillator arrangement is airtight and devoid of a sound output port.

Example Ex49. The device according to one or more of Ex44 to Ex48, wherein the oscillator arrangement is impervious to ear discharge, earwax, liquid, oil, and dust ingression.

Example Ex50. The device according to one or more of Ex44 to Ex49, wherein the housing is configured as an in-canal receiver of a receiver-in-canal (RIC) hearing device.

Example Ex51. The device according to one or more of Ex44 to Ex49, wherein the housing is configured as an invisible-in-canal (IIC), completely-in-canal (CIC), in-the-canal (ITC) or in-the-ear (ITE) hearing device.

Example Ex52. The device according to one or more of Ex44 to Ex51, wherein the vibratory transducer is configured to generate output signals having frequencies of up to at least 20 kHz.

FIG. 1 illustrates a method implemented by an ear-wearable electronic device in accordance with any of the embodiments disclosed herein. The method shown in FIG. 1 is implemented with a hearing device deployed 100 at least partially in a wearer's ear canal. The method involves receiving or generating 102 electrical signals indicative of sound. The method also involves generating 104, by an in-canal oscillator arrangement and in response to the electrical signals, output signals in the form of audible sound transmissible via air conduction to an eardrum and vibratory signals for stimulating a cochlea via transcranial bone conduction.

Figure 2:
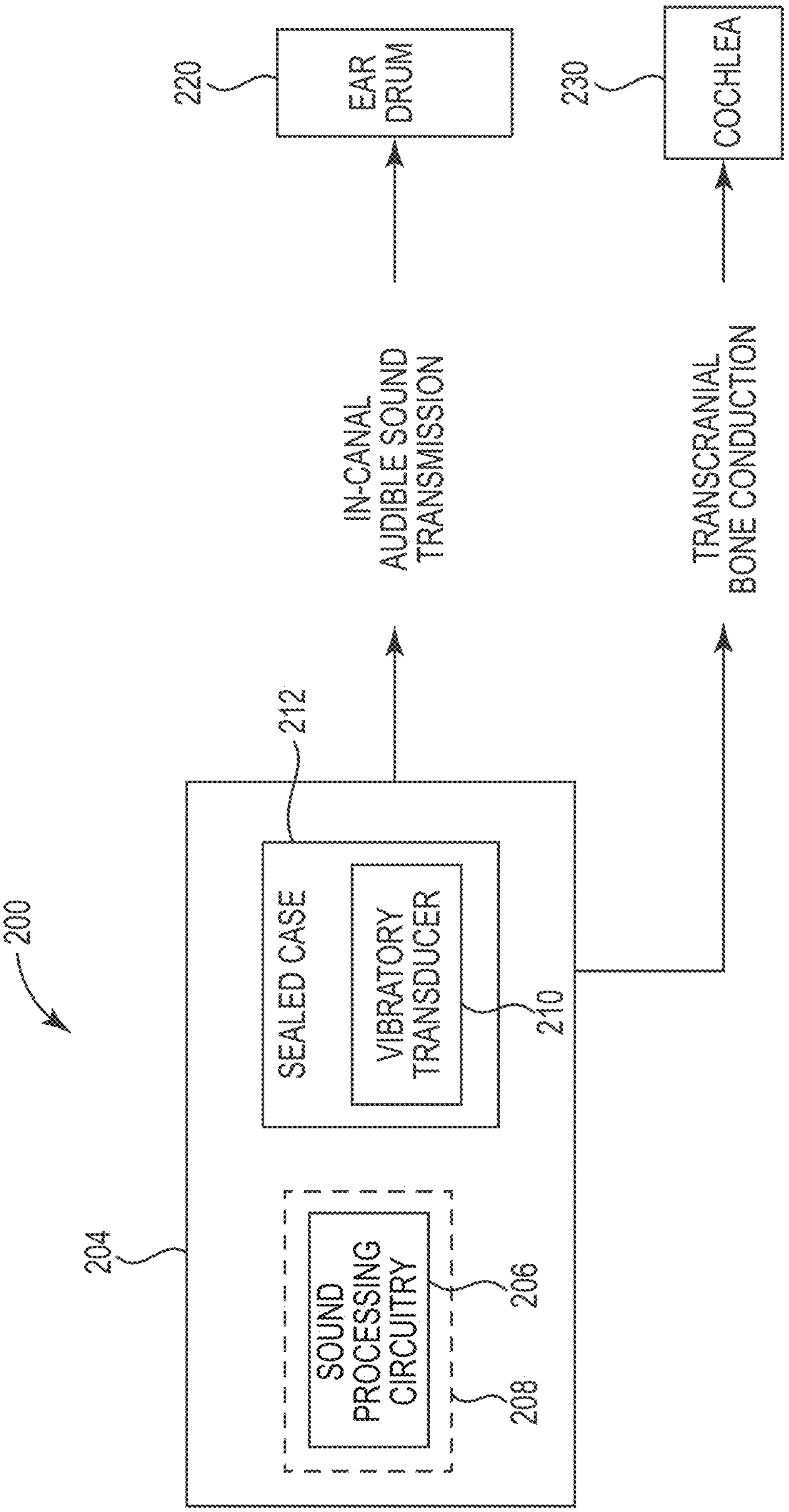
FIG. 2 illustrates an ear-wearable electronic device comprising a vibratory transducer in accordance with any of the embodiments disclosed herein.

FIG. 2 illustrates an ear-wearable electronic device in the form of a hybrid hearing device in accordance with any of the embodiments disclosed herein. The device 200 shown in FIG. 2 includes a housing 204 configured for deployment at least partially within an ear canal of a wearer. For example, the device 200 can be an in-the-canal (ITC), completely-in-the-canal (CIC), invisible-in-canal (IIC), in-the-ear (ITE), receiver-in-canal (RIC), or receiver-in-the-ear (RITE) type device.

The device 200 includes a vibratory transducer 210 disposed in the housing 204. The vibratory transducer 210 includes an oscillator arrangement disposed in a sealed case 415. In some implementations, the oscillator arrangement comprises an orthogonal oscillator arrangement. In other implementations, the oscillator arrangement comprises a radial oscillator arrangement. In further implementations, the oscillator arrangement comprises a swing oscillator arrangement.

In various implementations, the sealed case 415 is a sealed plastic case, but can also be a sealed metal case. Notably, the sealed case 415 is devoid of a sound output port or other sound outlet. In various implementations, the sealed case 415 is airtight. As previously mentioned, the vibratory transducer 210 is essentially maintenance free. As such, the vibratory transducer 210 is impervious to ear discharge, ear wax, liquid, oil, and dust ingression.

The vibratory transducer 210 is configured to generate output signals in the form of audible sound which is transmissible via air conduction to the wearer's eardrum 220 through the ear canal. The vibratory transducer 210 is also configured to generate output signals in the form of vibratory signals for stimulating a cochlea 230 of the wearer's ear via transcranial bone conduction. As such, the vibratory transducer 210 facilitates hearing of audible sounds through two different physiologic pathways (transcranial bone structure and the ear canal) and two different transmission mechanisms (bone conduction and air conduction).

The device 200 also includes sound processing circuitry 206 operatively coupled to the vibratory transducer 210. In some implementations, the sound processing circuitry 206 is disposed in the housing 204 which also encloses the vibratory transducer 210. In other implementations, some or all of the sound processing circuitry 206 can be housed in a separate housing 208, such as the housing of a behind-the-ear component of the device 200. The sound processing circuitry 206 can include components shown in, and discussed with respect to, the device of FIG. 9.

Figure 3:
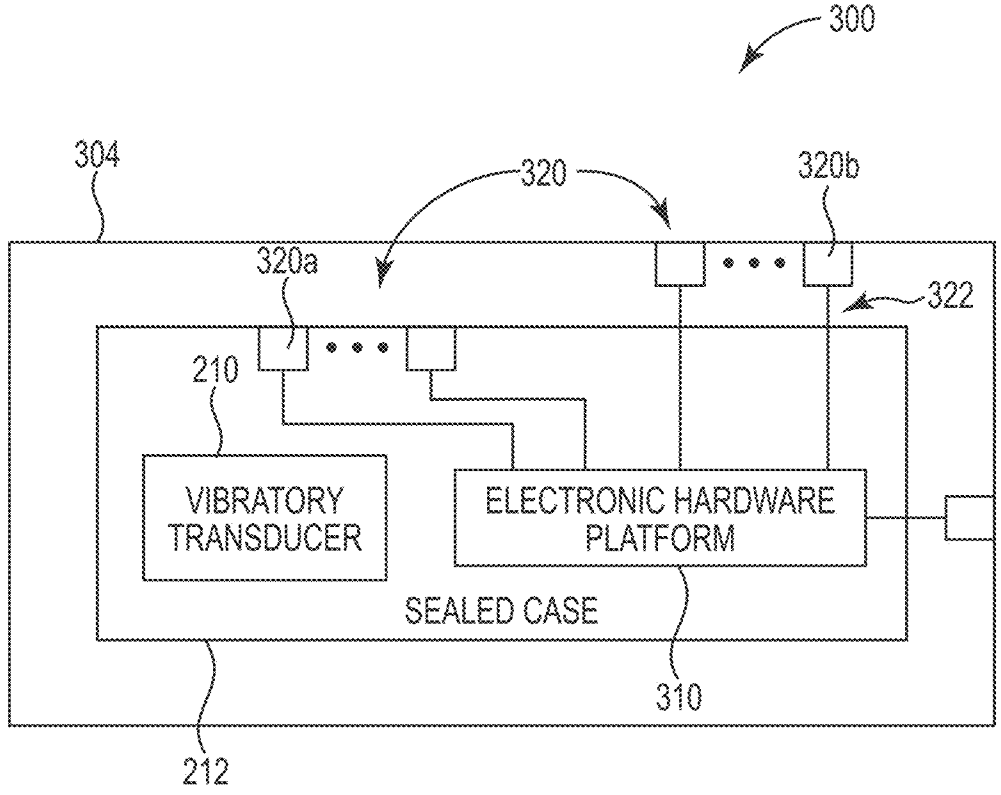
FIG. 3 illustrates an ear-wearable electronic device comprising a vibratory transducer in accordance with any of the embodiments disclosed herein.

FIG. 3 illustrates an ear-wearable electronic device 300 in accordance with any of the embodiments disclosed herein. As with previous embodiments, the device 300 includes a housing 304 configured for deployment at least partially in an ear canal of the device wearer. The device 300 includes a vibratory transducer 210 and an electronic hardware platform 310 disposed in a sealed case 415. In some implementations, the electronic hardware platform 310 can be situated within the device housing 304 outside of the sealed case 415. In other implementations, the electronic hardware platform 310 can be partially situated within the device housing 304 outside of the sealed case 415 and partially within the sealed case 415. It is noted that, in configurations in which the electronic hardware platform 310 is disposed entirely within the sealed case 415, electronic circuitry is not affected by moisture ingress.

The electronic hardware platform 310 can include processing circuitry operatively coupled to one or more sensors 320. In some implementations, one or more sensors 320*a* can be situated within or on the sealed case 415. In addition, or alternatively, one or more sensors 320*b* can be situated within or on the device housing 304 and operatively coupled to the electronic hardware platform 310 via sealed access ports 322. The sensors 320 can include a variety of sensors, such as one or more of a motion sensor (e.g., IMU, accelerometers, gyros) one or more optical sensors (e.g., photoplethysmography/PPG sensor, pulse oximeter), one or more electrode-based sensors (e.g., ECG, EEG, EMG, EOG, GSR sensors), one or more chemical or biochemical sensors (e.g., PH sensor), and/or one or more temperature sensors (e.g., thermistors, thermocouples).

For example, the electronic hardware platform 310 can include bioelectric sensing circuitry configured to one or more of sense, measure, and monitor changes in one or more of impedance, conductance, resistance, and capacitance of the wearer's skin. The bioelectric sensing circuitry can be configured to one or more of sense, measure, and monitor changes in one or more of electrodermal activity, hydration, and perspiration of the wearer's skin. The bioelectric sensing circuitry can be configured to measure and monitor electrical activity of various organs of the body, such as a wearer's heart (via an electrocardiogram or ECG), musculature (via an electromyogram or EMG), muscle or nerve action potential, brain (via an electroencephalogram or EEG), vision system (via an electrooptigram or EOG), and skin (via a galvanic skin reflex or GSR). In some implementations, microneedles or microelectrodes can be used for sensing one or more of ECG, EMG, EEG, EOG, ERG, EGC, and GSR waveforms, as well as other sensing applications that benefit from intimate body fluid contact.

The optical sensor(s) can include an infrared (IR) sensor arranged and configured for making temperature measurements of the eardrum and/or ear canal cavity, which is useful for monitoring body temperature and blood flow patterns. The optical sensor(s) can include a PPG sensor which utilizes a light emitter (e.g., one or more LEDs or laser diodes) configured to couple light into skin of the wearer and a light detector (e.g., a photosensor or photon detector) configured to receive light from the skin resulting from the light produced by the light emitter. Optical physiologic sensing circuitry of the electronic hardware platform 310 can be configured to produce a photoplethysmographic signal in response to light received by the light detector. In some embodiments in which at least two light sources of the light emitter of different wavelengths are included in the PPG sensor, the optical physiologic sensing circuitry can be configured to produce a pulse oximetry signal in response to light received by the light detector. In response to signals received from the light detector, the optical physiologic sensing circuitry produces an optical sensor output signal which can be communicated to a controller of the electronic hardware platform 310 (or the device controller) for storage in memory. The optical sensor output signal produced by the optical physiologic sensing circuitry can be used to perform a number of different physiologic measurements, such as measuring blood oxygen saturation, blood pressure, cardiac output, assessing autonomic function, and detecting peripheral vascular disease.

The biochemical sensor(s) can be implemented as one or more devices capable of converting a chemical or biological quantity into an electrical signal. The biochemical sensor(s) can be configured to interact with one of a variety of body fluids, such as sweat and interstitial fluids. In various implementations, the biochemical sensor(s) include an analyte molecule, a chemically sensitive layer, and a transducer. In some implementations, the biochemical sensor(s) can include a bed of microneedles.

The biochemical sensor(s) can be configured to sense an ingredient and concentration of one of more body fluids of the skin. For example, the biochemical sensor(s) can be configured to detect one or more of PH value, Ca+ concentration, and glucose concentration. Biochemical sensing circuitry of the electronic hardware platform 310 is provided and configured to produce a biochemical sensor output signal using signals produced by the biochemical sensor(s). The biochemical sensor output signal can be communicated to the controller of the electronic hardware platform 310 (or the device controller) for storage in memory.

The temperature sensor(s) can be implemented using various temperature sensing technologies. For example, the temperature sensor(s) can be a thermistor having a negative temperature coefficient (e.g., an NTC thermistor or NTC chip), a positive temperature coefficient (e.g., a PTC thermistor or PTC chip) or a digital thermistor. The temperature sensor(s) can be a surface mount device (SMD) thermistor, thermocouple, resistance temperature detector (RTDs) or other type of resistance temperature sensor. Temperature sensing circuitry of the electronic hardware platform 310 is provided and configured to produce a temperature sensor output signal using signals produced by the temperature sensor(s). The temperature sensor output signal can be communicated to the controller of the electronic hardware platform 310 (or the device controller) for storage in memory.

Orthogonal In-Canal Oscillator Arrangement

Figure 4:
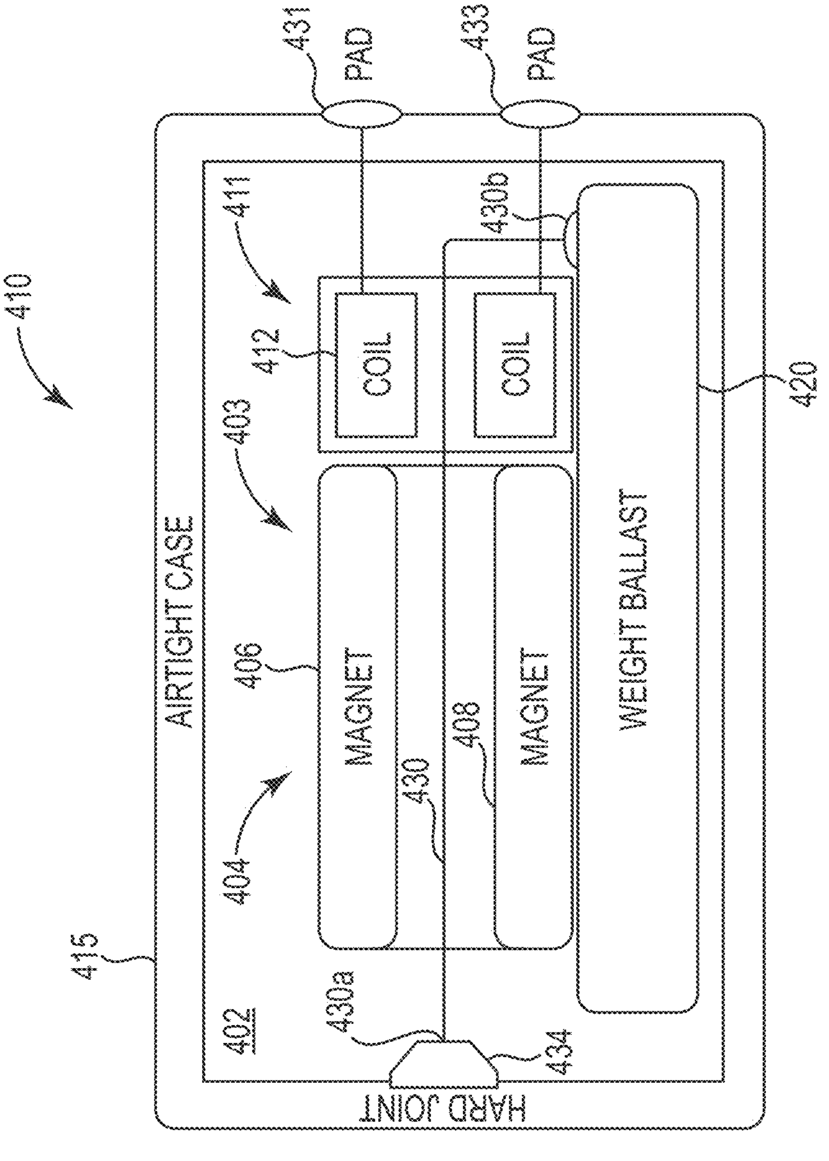
FIG. 4 illustrates a vibratory transducer comprising an orthogonal, single coil in-canal oscillator arrangement in accordance with any of the embodiments disclosed herein.
Figure 5:
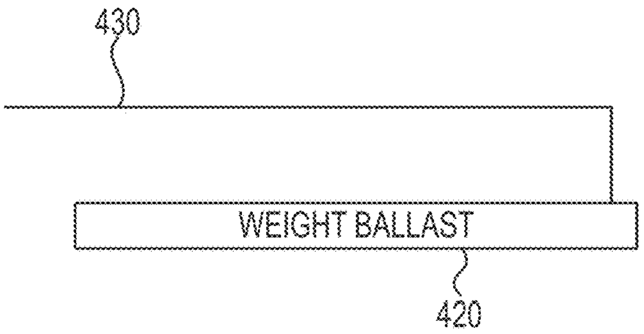
FIG. 5 illustrates an armature of an orthogonal in-canal oscillator arrangement having an L-shape according to any of the embodiments disclosed herein.
Figure 6:
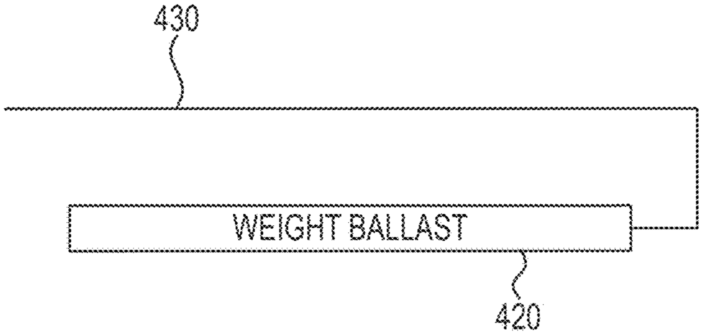
FIG. 6 illustrates an armature of an orthogonal in-canal oscillator arrangement having a U-shape according to any of the embodiments disclosed herein.
Figure 7:
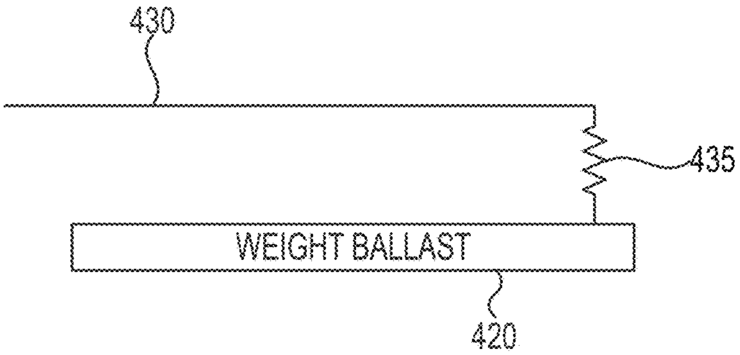
FIG. 7 illustrates an armature of an orthogonal in-canal oscillator arrangement having a zig-zag shape according to any of the embodiments disclosed herein.
Figure 8:
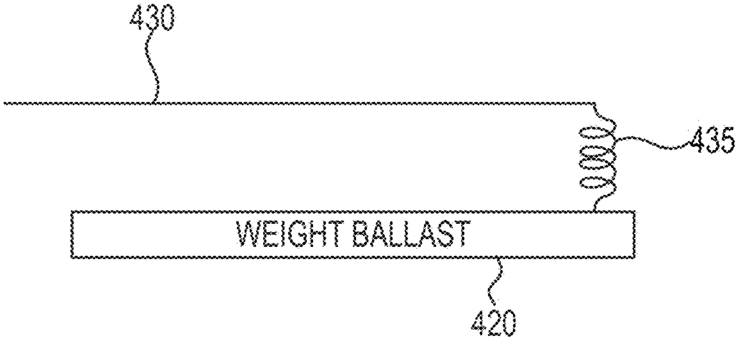
FIG. 8 illustrates an armature of an orthogonal in-canal oscillator arrangement having a spiral shape according to any of the embodiments disclosed herein.

FIG. 4 illustrates a vibratory transducer 410 in accordance with any of the embodiments disclosed herein. The vibratory transducer 410 includes a single coil, orthogonal in-canal oscillator arrangement 402 disposed in a sealed case 415. The working principle of the in-canal oscillator arrangement 402 is based on Newton's third law of action and reaction applied to comparative masses.

The in-canal oscillator arrangement 402 includes a magnet assembly 404 comprising a first magnet 406 and a second magnet 408 spaced apart from the first magnet 406. The first and second magnets 406, 408 can be permanent magnets, such as neodymium magnets. A coil arrangement 411, shown positioned proximate the magnet assembly 404, includes a main coil 412 through which an armature 430 passes. The coil arrangement 411 carries current received from the device's driver circuit via pads 431, 433. The pads 431, 433, which can be solder pads, are coupled to the electronics of the hearing device. It is noted that the leads connecting the pads 431, 433 and contacts of the main coil 412 pass through sealed access ports in the sealed case 415.

The in-canal oscillator arrangement 402 also includes a weight ballast 420 positioned proximate the second magnet 408 and the main coil 412. The armature 430 is positioned between the first and second magnets 406, 408 and is encompassed by the main coil 412. The armature 430 includes a first end 430*a* and an opposing second end 430*b*. The first end 430*a* is connected to the sealed case 415 at a hard joint 434. The second end 430*b* is connected to the weight ballast 420, such as at an end section of the weight ballast 420. It is understood that the components of the in-canal oscillator arrangement 402 can be arranged in a manner different from than that shown in FIG. 4.

Referring to the main coil 412, the armature 430 receives induced magnetic currents that interact with the magnetic fields from the first and second magnets 406, 408. The armature 430 can be glued or welded to an internal surface of the sealed case 415 to form the hard joint 434. Notably, the entire armature assembly 403 (e.g., magnet assembly 404, coil arrangement 411, weight ballast 420, armature 430) is suspended from the sealed case 415 only by the armature connection at the hard joint 434. As such, no portion of the in-canal oscillator arrangement 402 touches the sealed case 415 other than the first end 430*a* of the armature 430 at the hard joint 434. A damping arrangement (e.g., silicone tubes or members) can be situated between the armature assembly 403 and interior walls of the sealed case 415, which can dampen sharp vibration peaks and prevent the armature assembly 403 from touching the sealed case 415.

In the embodiment shown in FIG. 4, the armature 430 acts as a lever, amplifying the small vibrations that normally occur in receivers. Using the leverage of the armature 430 is a core feature of the in-canal oscillator arrangement 402, compared to the existing bone oscillators. Using the leverage of the armature 430 allows the in-canal oscillator arrangement to be sized down to the extent of being usable inside the ear canal.

The armature assembly 403 serves as an inertial mass or seismic mass. The weight of the armature assembly 403 can be selected for a given application, such as by adding or subtracting calibrated weight, for instance small plates of stainless steel or tin. The heavy armature assembly 403 acts as a counterweight that will make the sealed case 415 vibrate.

The working principle of the vibratory transducer 410 is as follows. The weight ballast 420 acts as ground due to its mass and inertia. It is desirable that the oscillator core (e.g., armature assembly 403) have a resonance frequency lower than the lowest working frequency. For example, the resonance frequency of the armature assembly 403 can be around 40 Hz to 50 Hz, whereas the lowest working frequency can start at 250 Hz.

At frequencies higher than the resonance frequency, due to its weight, the weight ballast 420 will conserve its state and oppose any momentum generated by the armature 430. This determines the oscillator's ability to take over the armature's momentum and act as an acoustic load with high impedance. This scenario occurs when the vibratory transducer 410 is not in the ear canal and vibrates freely.

When the vibratory transducer 410 is deployed in the ear canal and comes into contact with ear canal tissue, the vibration power is surged from the weight ballast 420 towards the ear canal tissue through the armature 430 and the sealed case 415. The tighter the fitting is between the vibratory transducer 410 and ear canal wall, the more the vibration can be transmitted transcranially to the cochlea. It is noted that the vibratory transducer 410 can transmit vibratory signals for stimulating the cochlea of a wearer via transcranial bone conduction even if earwax, ear discharge, liquid medication or water is present in the ear canal, due to the incompressible nature of such materials.

Being positioned within the ear canal, the sealed case 415 is trapped and has less freedom to vibrate. Therefore, the stored energy is released towards the weight ballast 420 this time, which acts as a heavy pendulum. The weight ballast 420 will now turn the energy into vibrations. The vibrations will propagate towards the sealed case 415 and be absorbed by the ear canal's tissue. The acoustic load associated with the sealed case 415 will drop its interface impedance. This low impedance of the load will closely match the internal equivalent impedance of the armature 430, therefore making possible an efficient transfer of power from the armature 430 to the ear canal. The vibrations that propagate to the sealed case 415 also cause the case 415 to transmit audible sound to the wearer's eardrum via air conduction through the ear canal.

The frequency response of the vibratory transducer 410 can be modified by the mass of the weight ballast 420. The frequency response of the vibratory transducer 410 can also be modified by the length and/or shape of the armature 430, which acts as a modulator and mechanical amplifier. For example, a shorter armature and strong neodymium magnets 406, 408 can facilitate the manufacture of in-canal oscillators that reach frequencies up to, and over, 20 kHz.

FIGS. 5-8 illustrate different arrangements of the armature 430 and the weight ballast 420 of a vibratory transducer in accordance with any of the embodiments disclosed herein. As was previously discussed, the frequency response of the vibratory transducer 410 can be modified by the length and/or shape of the armature 430. In the implementation shown in FIG. 5, the armature 430 has an L-shape. According to the implementation shown in FIG. 6, the armature 430 has a U-shape.

In other implementations, the armature 430 can have a complex and/or meandering shape. In the implementation shown in FIG. 7, a distal portion 435 of the armature 430 has a zig-zag shape. According to the implementation shown in FIG. 8, a distal portion 435 of the armature 430 has a spiral shape. In the implementations shown in FIGS. 7 and 8, the shape of the distal portions 435 increases the effective length of the armature 430. Accordingly, the size and shape of the armature 430 can be adjusted to tune the frequency response of the vibratory transducer 410.

Figure 9:
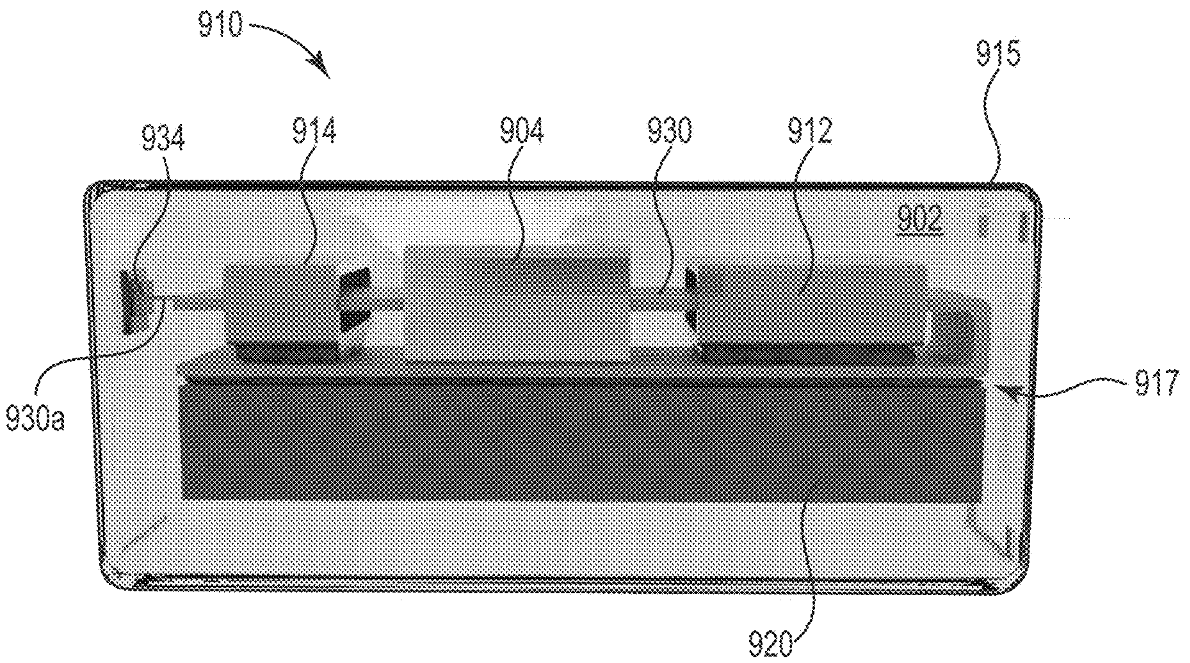
FIG. 9 illustrates a vibratory transducer comprising an orthogonal, dual coil in-canal oscillator arrangement in accordance with any of the embodiments disclosed herein.
Figure 10:
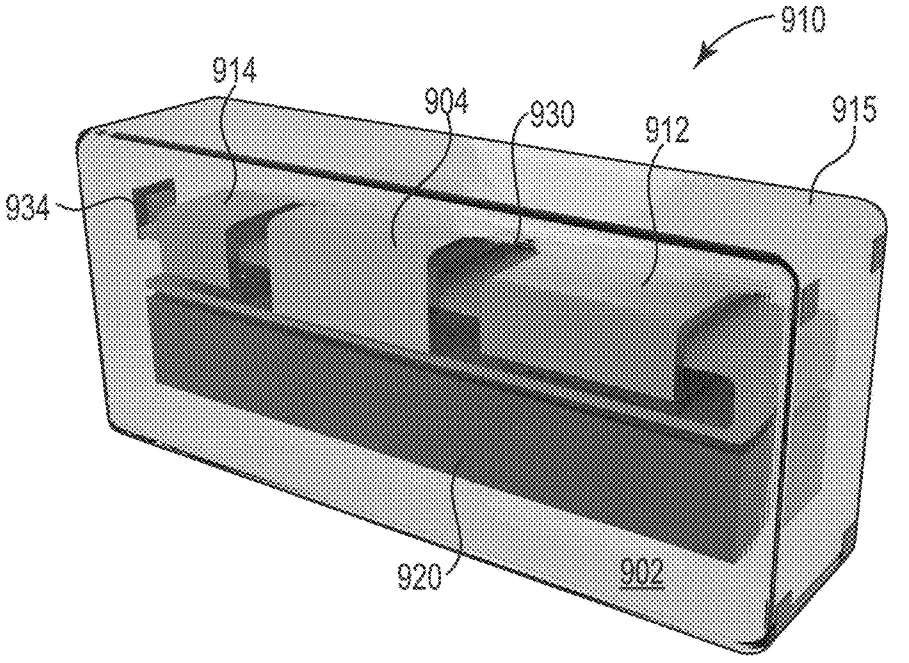
FIG. 10 illustrates a vibratory transducer comprising an orthogonal, dual coil in-canal oscillator arrangement in accordance with any of the embodiments disclosed herein.
Figure 11:
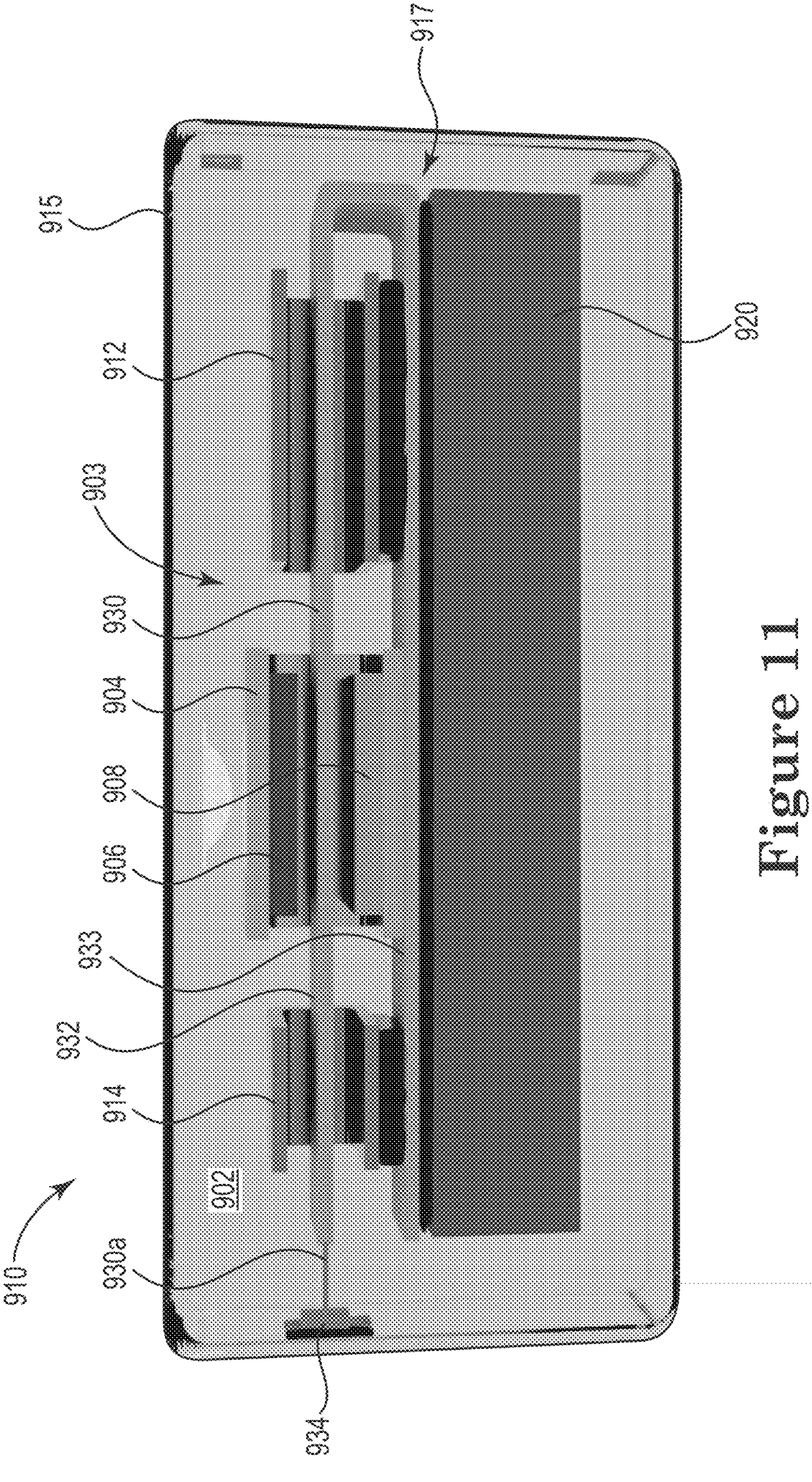
FIG. 11 illustrates a vibratory transducer comprising an orthogonal, dual coil in-canal oscillator arrangement in accordance with any of the embodiments disclosed herein.
Figure 12:
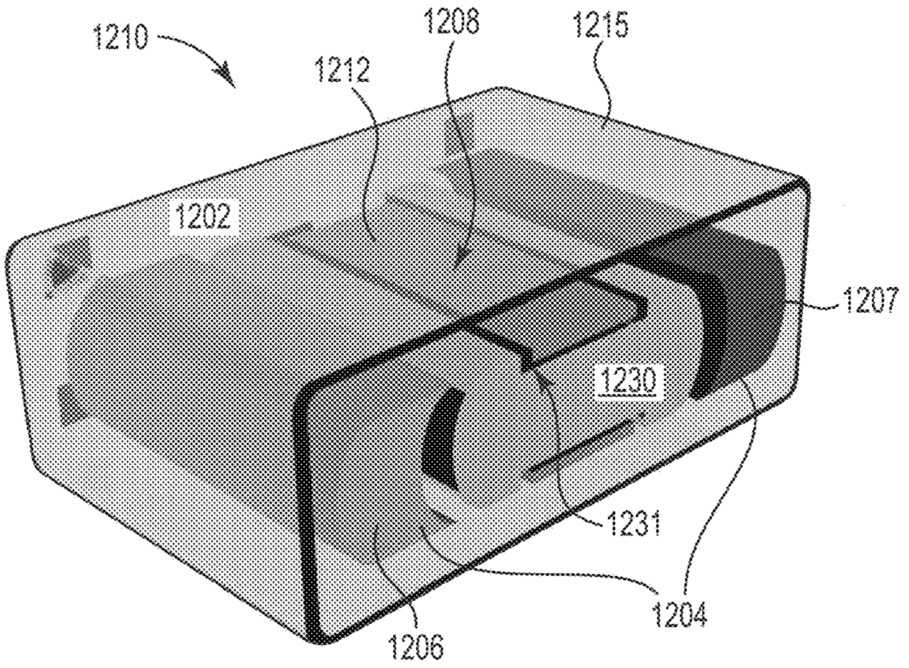
FIG. 12 illustrates a vibratory transducer comprising a radial in-canal oscillator arrangement in accordance with any of the embodiments disclosed herein.
Figure 13:
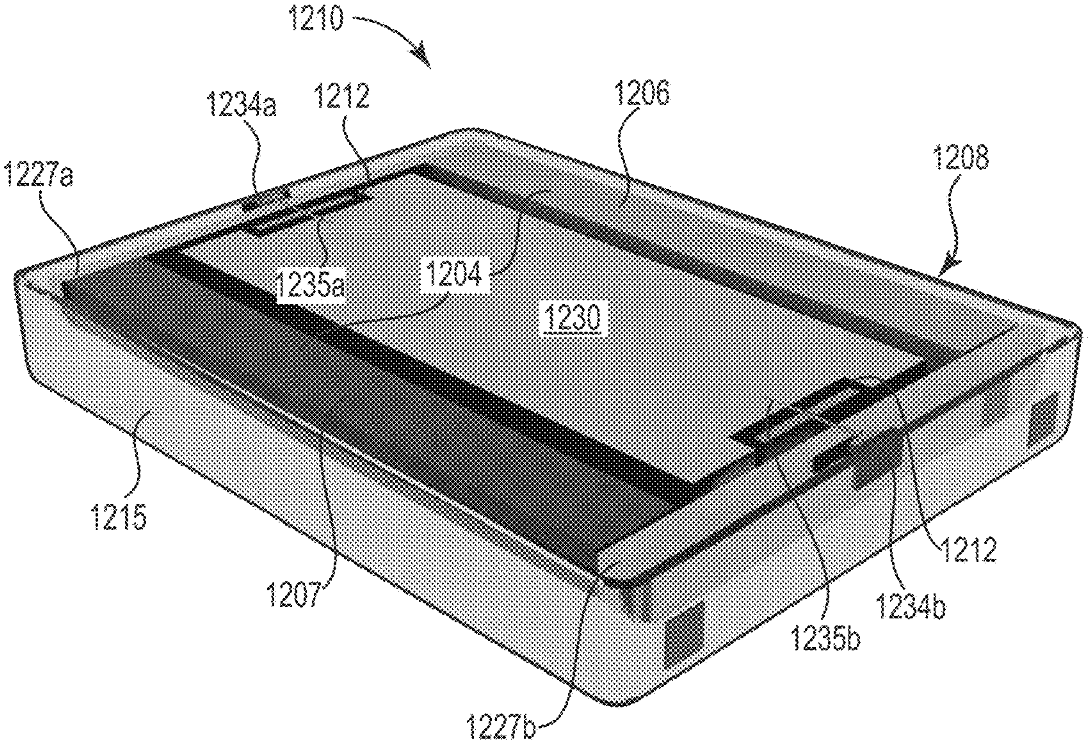
FIG. 13 illustrates a vibratory transducer comprising a radial in-canal oscillator arrangement in accordance with any of the embodiments disclosed herein.

FIGS. 9-11 illustrate a vibratory transducer 910 in the form of a dual coil, orthogonal in-canal oscillator arrangement 902 in accordance with any of the embodiments disclosed herein. The oscillator arrangement 902 is similar to that shown in FIG. 4, but includes an additional coil, referred to as a control coil 914. As shown, the oscillator arrangement 902 includes an armature assembly 903 connected to a weight ballast 920.

The armature assembly 903 includes an armature 930 which has an upper member 932 and an opposing lower member 933. The lower member 933 is connected to the weight ballast 920 via an adhesive or a weld. A pivoting point 917 is defined at the location of the armature 930 that first contacts the weight ballast 920. The upper member 932 of the armature 930 passes through a main coil 912, a magnet assembly 904 comprising first and second magnets 906, 908, and the control coil 914. The control coil 914 is used to dampen undesired frequencies by inducing unbalanced counter AC currents, which are of the same frequency as the one that needs to be damped out but of opposite phase, the intensity of which can be modulated by various feedback-cancelation/noise reduction/response-shaping algorithms.

An arm 930*a* (e.g., made from titanium) extends from a terminal end of the upper member 932 and connects with a plate or anchor that forms a hard joint 934 with a face of the sealed case 915. It is noted that the various components of the oscillator arrangement 902 are connected to the lower member 933 of the armature 930 via an adhesive or weld, which (lower member 933) in turn is connected to the weight ballast 920 via an adhesive or a weld.

Radial In-Canal Oscillator Arrangement

FIGS. 12-15 illustrate a vibratory transducer 1210 in the form of a radial in-canal oscillator arrangement 1202 in accordance with any of the embodiments disclosed herein. The radial in-canal oscillator arrangement 1202 provides the same functionality and has the same or similar properties as the orthogonal in-canal oscillator arrangements 402, 902 shown in FIGS. 4 and 9-11. The differences between the orthogonal in-canal oscillator arrangements 402, 902 and the radial oscillator arrangement 1202 are the structure of the armature and the way the vibration force is applied to the sealed case 1215. In general terms, the radial oscillator armature works on the principle of an electrical motor.

Figure 14:
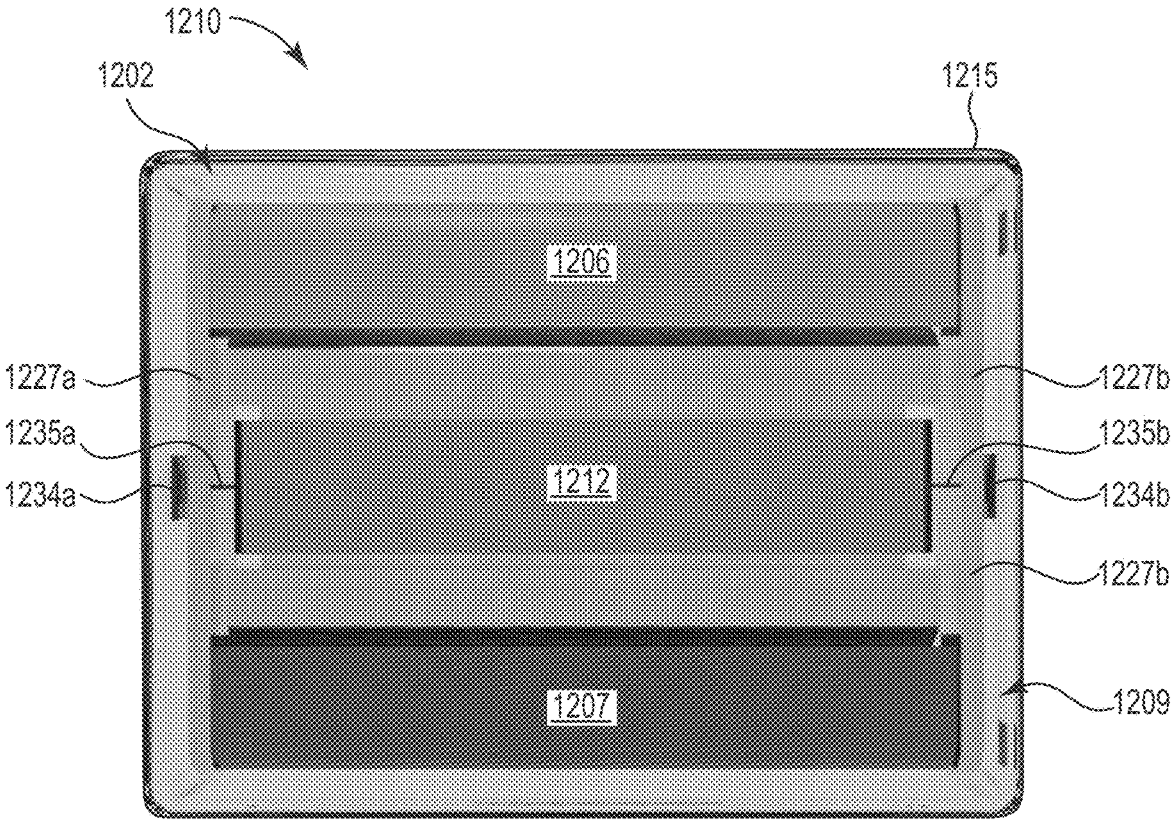
FIG. 14 illustrates a vibratory transducer comprising a radial in-canal oscillator arrangement in accordance with any of the embodiments disclosed herein.

The radial oscillator arrangement 1202 comprises a rotor 1208 which includes a coil 1212 wrapped around a ferromagnetic core 1230. The coil 1212 is positioned in a groove 1231 provided along the periphery of the ferromagnetic core 1230. Embedded in, and extending from, the ferromagnetic core 1230 are axles 1235*a*, 1235*b* of the rotor 1208. The axles 1235*a*, 1235*b* are positioned along the rotor's axis, as can be seen in FIG. 14.

The radial oscillator arrangement 1202 also includes a stator 1209 which includes magnets 1206, 1207 of a magnet assembly 1204 and holding plates 1227*a*, 1227*b*. The holding plates 1227*a*, 1227*b* hold the magnets 1206, 1207 together in a rigid fixture, such as by being glued to them. The coil 1212 and holding plates 1227*a*, 1227*b* include shaft holes that allow the axles 1235*a*, 1235*b* to pass therethrough. The axles 1235*a*, 1235*b* are rigidly connected to the sealed case 1215, so that the rotor 1208 and sealed case 1215 form one rigid part/body. The stator 1209 is suspended by the axles 1235*a*, and 1235*b* by trapping them into their respective shafts 1238*a*, 1238*b* (see FIG. 15). Two hard joints 1234*a*, 1234*b* are formed on opposing sides of the sealed case 1215. The sealed case 1215 can include soldering pads for connecting conductors to the radial oscillator arrangement 1202 (e.g., for connecting drive circuitry to the radial oscillator arrangement 1202).

As previously discussed, the force generated by the radial oscillator arrangement 1202 is applied to the sealed case 1215 in the form of torque, symmetrically, at two of the opposing faces of the sealed case 1215 through hard joints 1234*a*, 1234*b* (e.g., with one of the faces facing the eardrum). Each of the hard joints 1234*a*, 1234*b*, which constitute a torque transmission point, comprises a tip or distal end of the rotor's two axles 1235*a*, 1235*b*. The tips of the two axles 1235*a*, 1235*b* can be hard glued or welded directly to the sealed case 1215 or to an anchor or plate that is embedded in the sealed case 1215. As is best seen in FIG. 14, other than the two hard joints 1234*a*, 1234*b*, the entire radial oscillator arrangement 1202 remains suspended inside the sealed case 1215, not touching the sealed case 1215 at any time.

During operation, the stator 1209 of the radial oscillator arrangement 1202 will experience small angular motions, clockwise and counterclockwise. This motion will make the rotor's transversal plane pass by the balance point (where the rotor's horizontal plane is aligned and superposed with stator's horizontal plane) with a frequency in the range of audible spectrum. The accumulated mass of the magnets 1206, 1207 and the holding plates 1227*a*, 1227*b* make up the ballast weight or seismic mass for the radial oscillator arrangement 1202.

Figure 15:
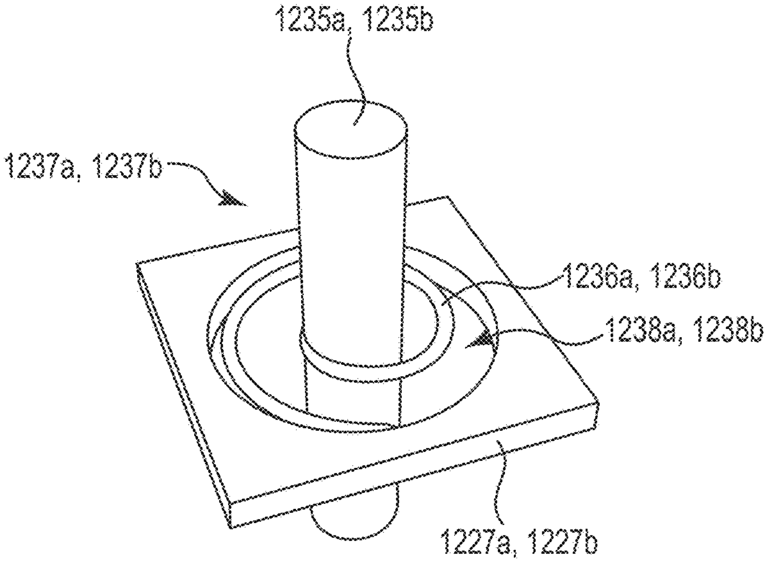
FIG. 15 illustrates components of a vibratory transducer comprising a radial in-canal oscillator arrangement in accordance with any of the embodiments disclosed herein.
Figure 16:
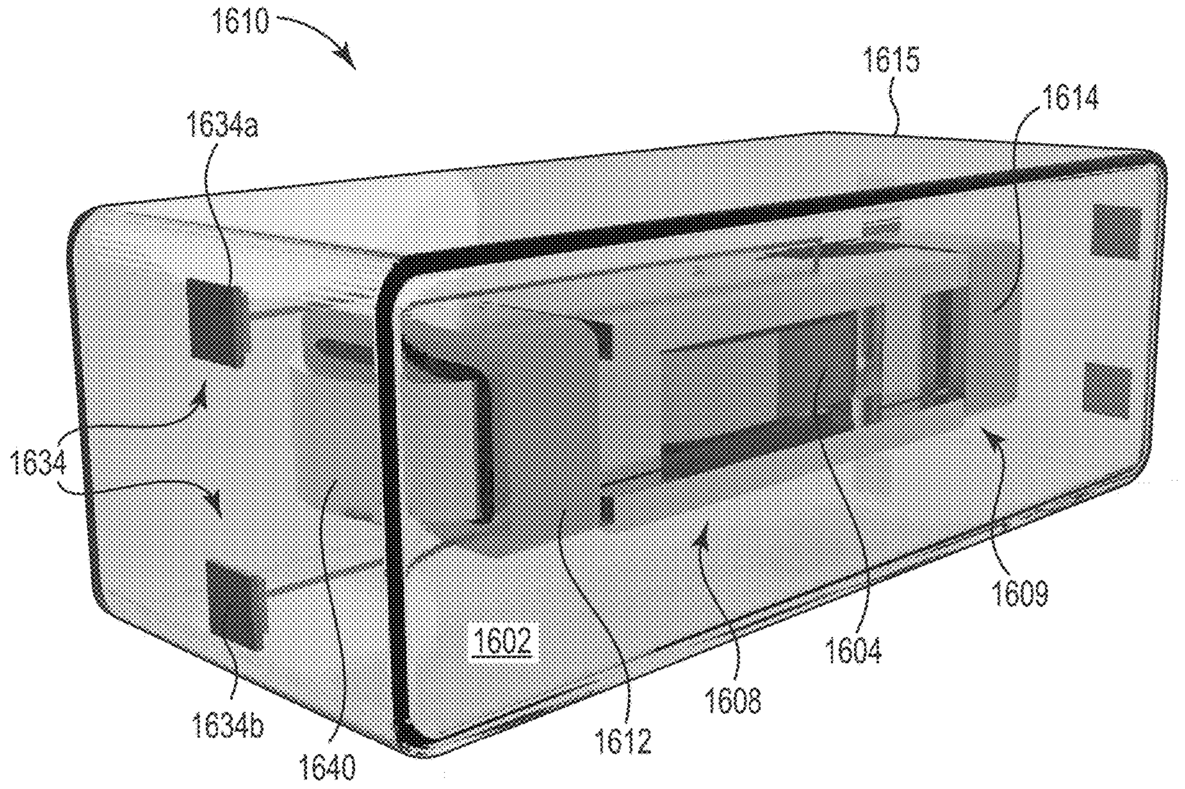
FIG. 16 illustrates a vibratory transducer comprising a swing in-canal oscillator arrangement in accordance with any of the embodiments disclosed herein.
Figure 17:
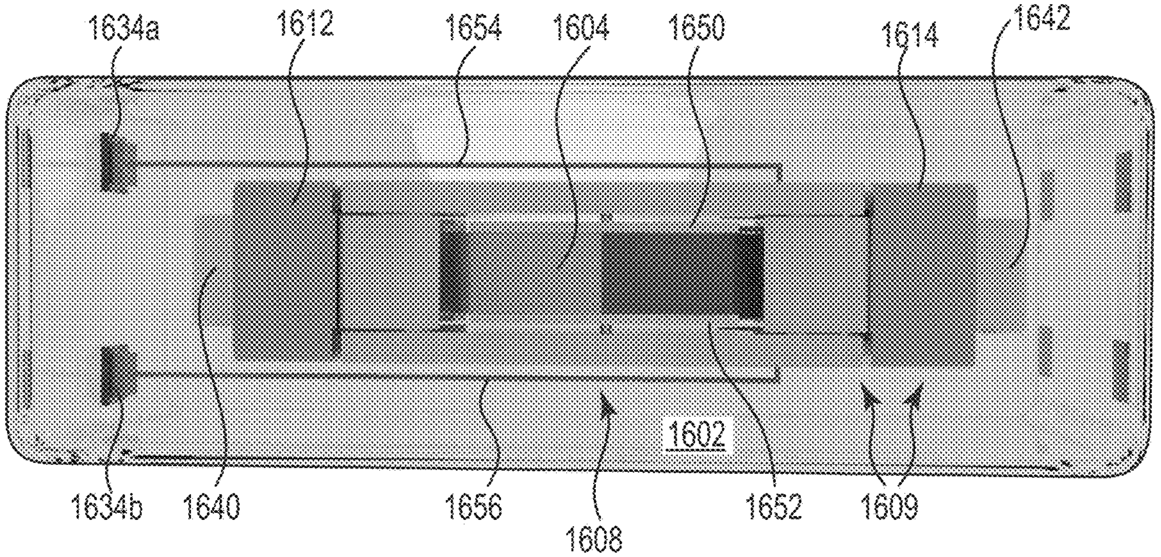
FIG. 17 illustrates a vibratory transducer comprising a swing in-canal oscillator arrangement in accordance with any of the embodiments disclosed herein.

For increased efficiency and a stronger neutral position, the shafts 1238*a*, 1238*b* at the location where the rotor's axles 1235*a*, 1235*b* pass through the plates 1227*a*. 1227*b* can include a spring arrangement 1237*a*, 1237*b* (see FIG. 15). The spring arrangement 1237*a*, 1237*b* can include a watch spring (e.g., a spiral spring) 1236*a*, 1236*b*. The spring arrangement 1237*a*, 1237*b* includes a watch spring 1236*a*, 1236*b* connected to the axle 1235*a*, 1235*b* and the holding plate 1227*a*, 1227*b*. The watch springs 1236*a* and 1236*b* of the two spring arrangements 1237*a* and 1237*b* are wound opposite to one another, such that the rotor's horizontal plane is aligned and superposed with stator's horizontal plane when the radial oscillator arrangement 1202 is not powered.

In terms of efficiency, the arrangement shown in FIG. 15 can reduce friction between the shaft 1238*a*, 1238*b* and axle 1235*a*, 1235*b* down to zero. In terms of a stronger neutral position, the rotor 1208 can return quicker to its resting position, making it suitable for an increased range of high frequencies. Incorporating the spring arrangement 1237*a*, 1237*b* can also allow the rotor 1208 to be fabricated from a lighter ferrite material. It is noted that a ferrite rotor 1208 is better suited for higher sound frequencies than those with an iron core, because the hysteresis introduced by the latter may limit the efficiency in using high frequencies. Also, a ferrite core 1230 of the rotor 1208 in conjunction with spring arrangements 1237*a*, 1237*b* can be used to design a heavier seismic mass while preserving the same total mass. This serves to increase the mass ratio, and provides for better matching of the impedance with the ear canal better (e.g., practically making the case vibrate harder and have a better yield).

In some implementations, the rotor 1208 can be a permanent magnet and the stator 1209 can be magnetized by coil(s). In such implementations, torque will be transmitted the same way as discussed above. In other implementations, the axels 1235*a*, 1235*b* can be intentionally misaligned relative to the rotor's axis but still parallel to it, so part of the rotor 1208 will asymmetrically increase the seismic mass. The power is transmitted as a sum of torque and orthogonal vibration, with torque being significant.

Swing In-Canal Oscillator Arrangement

FIGS. 16-24 illustrate a vibratory transducer 1610 in the form of a swing in-canal oscillator arrangement 1602 in accordance with any of the embodiments disclosed herein. The swing oscillator arrangement 1602 is named after the swing (arc shape) oscillation of the stator. A feature of the swing oscillator arrangement 1602 is the transformation of the torque at the rotor level into orthogonal motion of the sealed case 1615.

Figure 20:
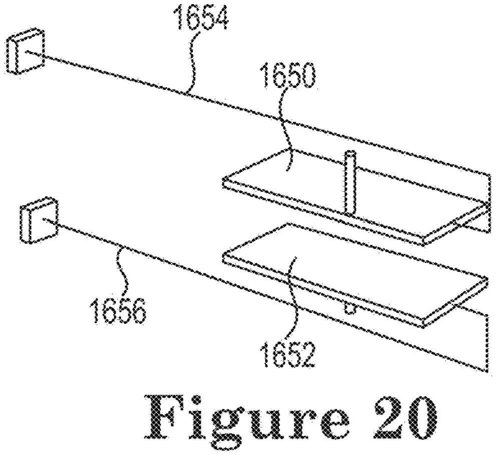
FIG. 20 illustrates components of a vibratory transducer comprising a swing in-canal oscillator arrangement in accordance with any of the embodiments disclosed herein.
Figure 21:
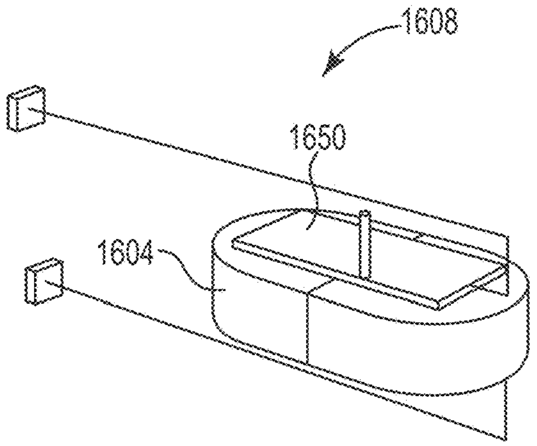
FIG. 21 illustrates components of a vibratory transducer comprising a swing in-canal oscillator arrangement in accordance with any of the embodiments disclosed herein.
Figure 22:
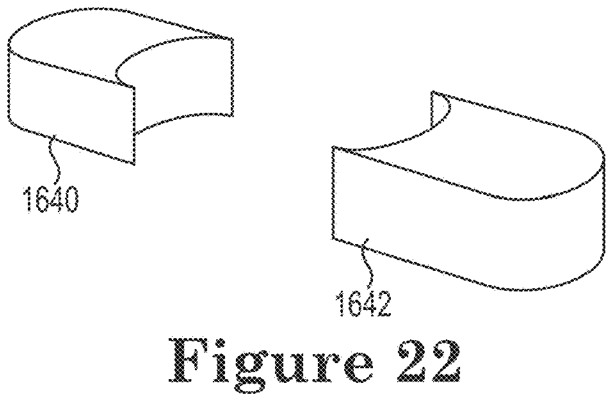
FIG. 22 illustrated components of a vibratory transducer comprising a swing in-canal oscillator arrangement in accordance with any of the embodiments disclosed herein.
Figure 23:
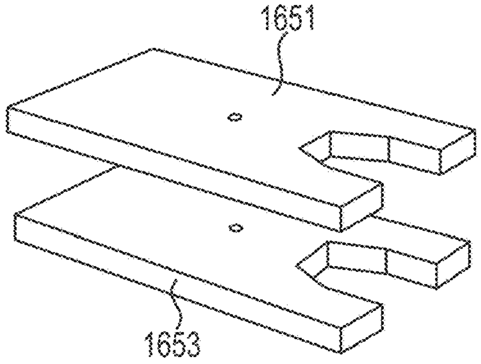
FIG. 23 illustrates components of a vibratory transducer comprising a swing in-canal oscillator arrangement in accordance with any of the embodiments disclosed herein.
Figure 24:
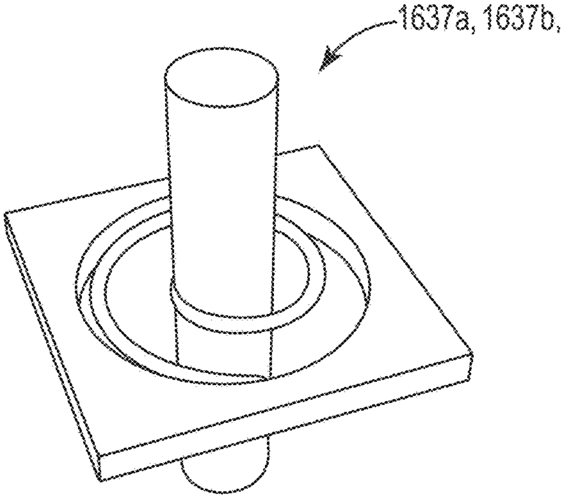
FIG. 24 illustrates components of a vibratory transducer comprising a swing in-canal oscillator arrangement in accordance with any of the embodiments disclosed herein.

The swing oscillator arrangement 1602 includes a rotor 1608 which is an assembly made up of a strong bipolar rotor magnet 1604, two rotor holding plates 1650, 1652, and two arms 1654, 1656 (e.g., elongated titanium members, see FIGS. 20 and 21). The rotor magnet 1604 can have a racetrack configuration (see FIG. 21), shaped as a rectangle with two half circles, one at each end of the rectangle. The round ends are the magnetic poles of the rotor magnet 1604. One of the rotor holding plates 1650 is attached (e.g., glued) to one surface of the rotor magnet 1604, and the other rotor holding plate 1652 is attached to the opposing surface of the rotor magnet 1604.

The orthogonal axis of the faces of the rotor holding plates 1650, 1652 is the same as the axis of the rotor magnet 1604, such that longest axis of the rotor holding plates 1650, 1652 and rotor magnet 1604 are in the same plane. A role of the rotor holding plates 1650, 1652 is to provide the magnet core an axle and to connect the two arms 1654, 1656 (e.g., serving as "axle and arms holding plates"). It is noted that the two arms 1654, 1656 are long, light, and thin, and they will transmit the circular oscillation of the rotor 1608 to sealed case surface that faces the eardrum, making the sealed case 1615 vibrate strongly.

The stator 1609 is an assembly made up of two ferromagnetic stator cores 1640, 1642, two coils 1612, 1614, and two holding plates 1651, 1653 with a "V" cut at one of the ends (referred to as V plates). The ferromagnetic stator cores 1640, 1642 are physically separated from each other before the assembling, and they are magnetized by two separated coils 1612, 1614 disposed on opposing sides of the rotor 1608. The ferromagnetic stator cores 1640, 1642 have a negative shape of the rotor magnet's round ends at the ends that face the rotor 1608, making it possible to position the ferromagnetic stator cores 1640, 1642 very close to the rotor 1608 for an efficient magnetic interaction.

Figure 18:
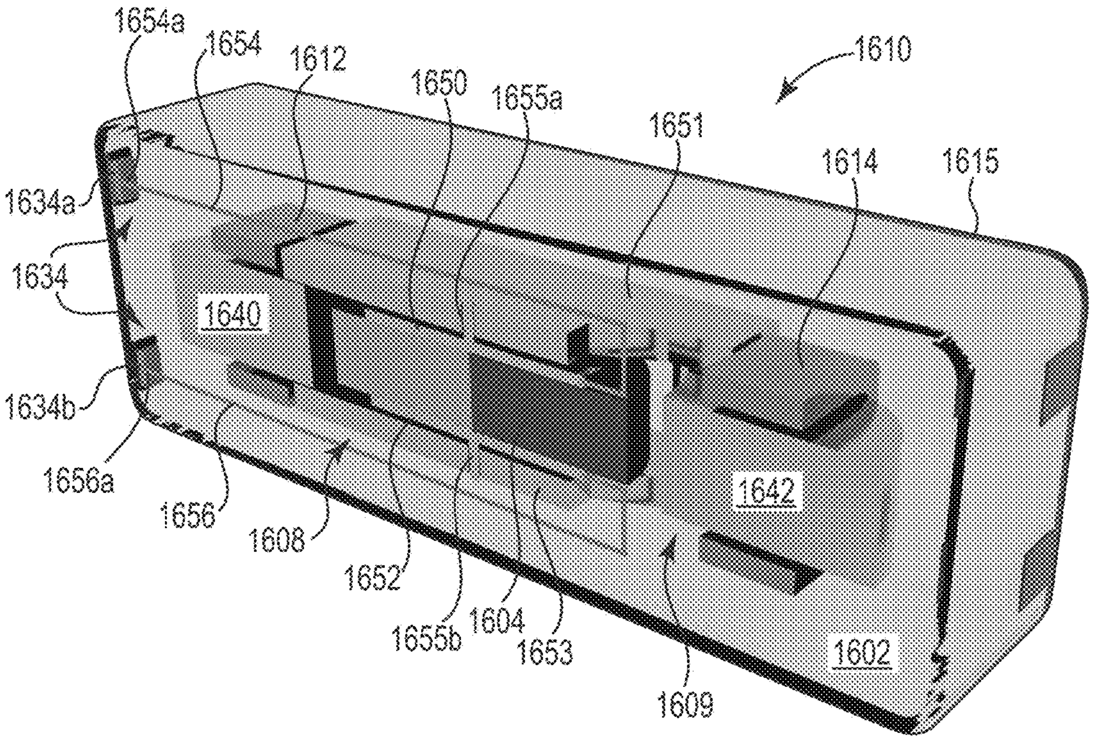
FIG. 18 illustrates a vibratory transducer comprising a swing in-canal oscillator arrangement in accordance with any of the embodiments disclosed herein.
Figure 19:
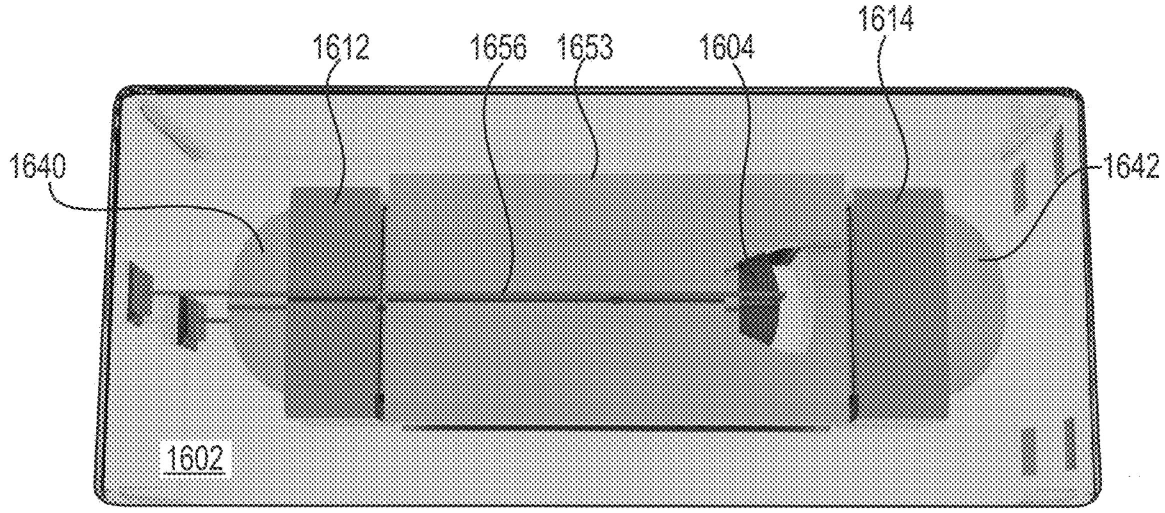
FIG. 19 illustrates a vibratory transducer comprising a swing in-canal oscillator arrangement in accordance with any of the embodiments disclosed herein.

The coils 1612, 1614 are separated before assembling. The coils 1612, 1614 can be wired in parallel or series. In some implementations, the coil 1614 near the tip of the oscillator arrangement 1602 can serve as the driving (main) coil and the second coil 1612 can serve as a control coil (discussed previously). The V plates 1651, 1653 have a cut in a "V" shape to allow the two arms 1654, 1656 to emerge from the rotor holding plates 1650, 1652 (see FIG. 19). The V plates 1651, 1653 also physically connect to the two ferromagnetic stator cores 1640, 1642 to define a rigid fixture, being attached (e.g., glued) to them. The arms 1654, 1656 are rigidly connected to the sealed case 1615. Therefore, the rotor 1608 and the sealed case 1615 form one rigid part/body. The V plates 1651, 1653 also hold the stator 1609 suspended and free to rotate without touching the rotor 1608 or anything else apart from the rotor's axles, by trapping the rotor's axles into their respective shafts (see FIG. 24). As can be seen in FIG. 18, the V plates 1651, 1653 provide for axle through shafts 1655 configured to receive axles of the rotor 1608 (see FIG. 24).

In comparison to the radial oscillator arrangement 1202 previously discussed, the swing oscillator arrangement 1602 is unbalanced because the hard joints 1634*a*, 1634*b* of the hard joint arrangement 1634 are positioned on only one face of the sealed case 1615. Therefore, most of the power generated by the swing oscillator arrangement 1602 is transferred to the side of the oscillator arrangement 1602 that faces the eardrum. This position will have a strong impact on the bony area of the canal, consequently increasing the ratio of the vibration transmitted by bone conduction. Each hard joint 1634*a*, 1634*b* of the hard joint arrangement 1634 in the swing oscillator arrangement 1602 is made up of a tip 1654*a*, 1656*a* of the "U" shape arm 1654, 1656, which is glued or welded directly to the sealed case 1615 or to an anchor embedded in the sealed case 1615. The entire swing oscillator arrangement 1602 hangs suspended by the two arms 1654, 1656 on the two hard joints 1634*a*, 1634*b*.

During operation, the stator 1609 of the swing oscillator arrangement 1602 will have small angular motions, clockwise and counterclockwise. This motion will cause the rotor's longitudinal plane to pass by the balance point (where the rotor 1608 is aligned with the magnet 1604) with a frequency in the range of audible spectrum. The combined mass of the ferromagnetic stator cores 1640, 1642, their respective coils 1614, 1612 and the "V" holding plates 1651, 1653 make up the ballast weight or seismic mass for this swing oscillator arrangement 1602. In some implementations, the swing oscillator arrangement 1602 can incorporate a watch spring arrangement 1637*a*, 1637*b* (e.g., a spiral spring) (see FIG. 24) as is described above with regard to the radial oscillator arrangement 1202.

Figure 25:
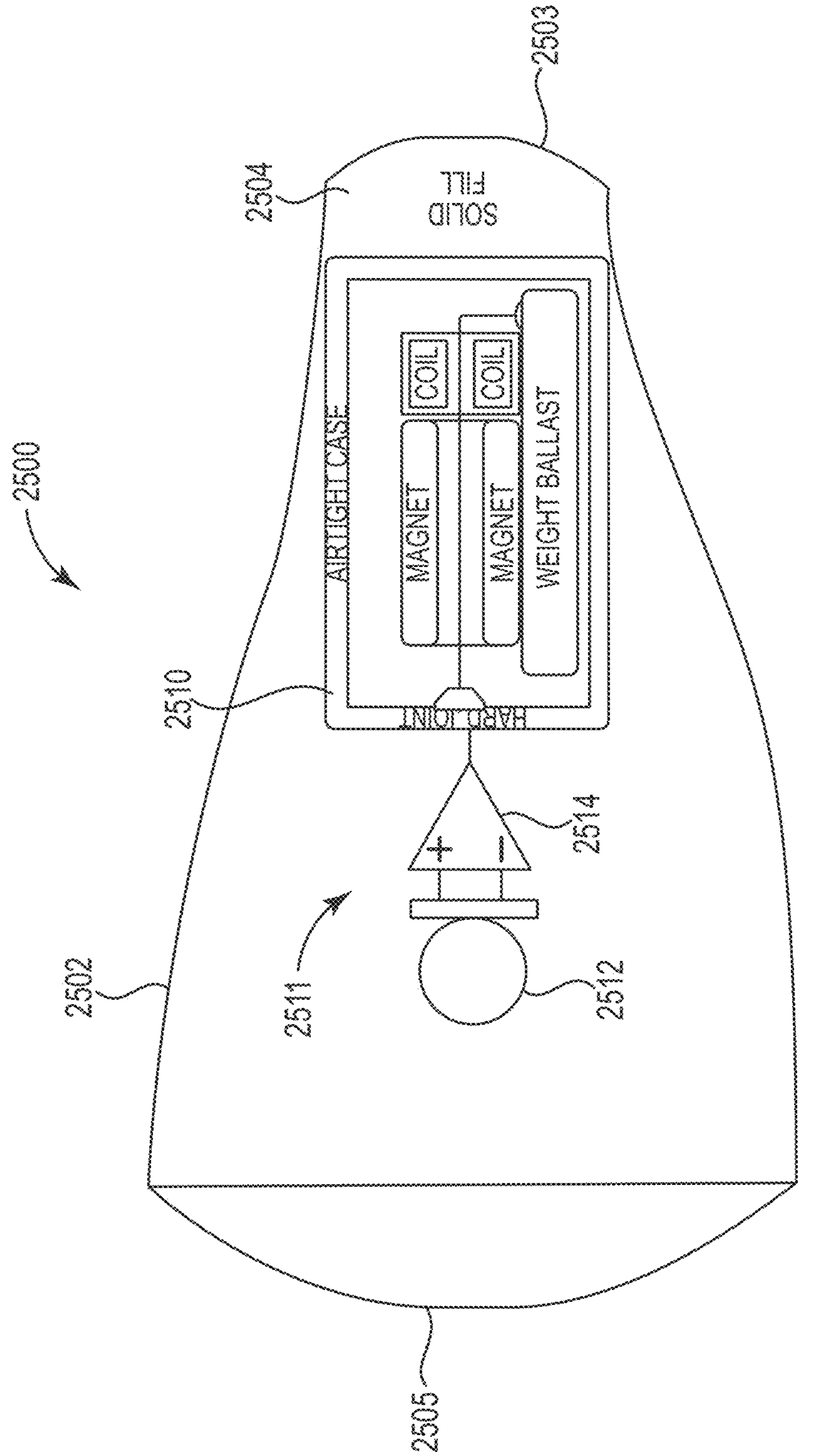
FIG. 25 illustrates an ear-wearable electronic device which incorporates a vibratory transducer in accordance with any of the embodiments disclosed herein.

FIG. 25 illustrates an ear-wearable electronic device 2500 which can incorporate any of the vibratory transducers disclosed herein. The device 2500 shown in FIG. 25 is representative of an in-canal hearing device which is configured to be partially or completely deployed in an ear canal of a wearer. The device 2500 includes a proximal end 2505 and an opposing distal end 2503. The distal end 2503 is directed towards the eardrum when the device 2500 is deployed in the ear canal. The position of the vibratory transducer 2510 is biased towards the distal end 2503, preferably in a region which comes into intimate contact with the ear canal tissue.

In this representative embodiment, the hearing device 2500 includes audio processing circuitry 2511 comprising a drive circuit 2514. The drive circuit 2514 can be coupled to an in input 2512, which can be a microphone, a cable input port, or a wireless device. The audio processing circuitry 2511 is coupled to the vibratory transducer 2510 via electrical contact/solder pads (see, e.g., pads 431, 433 shown in FIG. 4). The vibratory transducer 2510 can be hard glued (e.g., an epoxy material) or embedded into the wall of the shell 2502 or a case of the hearing device 2500. This arrangement extends the acoustic conduction from the sealed case of the vibratory transducer 2510 to the case or shell of the hearing device 2500 with minimal transfer loss. It is noted that the vibratory transducer 2510 can be electrically or inductively coupled to an output of the hearing device's electronics.

It is also noted that the distal end 2503 of the device 2500 can include solid fill material 504 (e.g., adhesive, excess shell material) because the sealed case of the vibratory transducer 2510 is spoutless (devoid of a sound output port or sound outlet). It is further noted that the vibratory transducer 2510 can replace standard receivers where the fitting allows (e.g., a drop-in replacement for a standard receiver). The vibratory transducer 2510 can also be attached (e.g., glued) inside the shells of custom hearing instruments or RIC earpieces, for example.

In the case of a RIC device, the vibratory transducer 2510 connects to a multiwire RIC cable configured to transmit multiple signals, direct or multiplexed. The free pins on the actual RIC cable connector can be used to power an integrated electronic hardware platform (e.g., see FIG. 3), which can connect the integrated sensors mentioned previously with the host device through an I2C bus or similar multiplexing technology.

A hearing device of the present disclosure can be implemented according to any one or more of the following examples:

Example 1

A vibratory transducer can include a multiplicity of in-canal oscillators. The in-canal oscillators can be grouped in clusters of two or more, with the same or different specifications, to increase the gain over a specific spectrum or to broaden the audio spectrum.

Example 2

A vibratory transducer can include a multiplicity of in-canal oscillators. The in-canal oscillators in a cluster can connect to the circuit on the same feeding cable for all oscillators or with separate wires for each oscillator if they are different, which can avoid a loss of channel power through a passive filter.

Example 3

An in-canal oscillator can have the feedback controlled by another oscillator in a cluster configuration, through phase cancellation. To the controlling oscillator can be sent a signal of opposite phase to the signal sent to the main oscillator, only in a very limited range of the feedback frequency. As such, the feedback can be cancelled but the sound on those frequencies is still usable.

Example 4

An in-canal oscillator can have a built-in control coil on the same axis of the armature or in a location that provides more leverage (e.g., in the armature's U-turn section for instance). The control coil is fed separately from a phase cancellation circuit. This can upgrade or replace the cluster of Example 3, in cases where there is insufficient room for clusters or where a more precise feedback attenuation solution is needed.

Example 5

The control coil from Example 4 can control the spectrum shape by using phase attenuation through the same method as the phase cancellation.

Example 6

The in-canal oscillator from Example 4 can use the built-in control coil to permanently damp the whole frequency response. This can be done by feeding the control coil (which should be weaker and smaller than the main coil) with the same signal as the main coil but the attenuation will come from the opposite magnetic fields induced in the armature, across the whole spectrum. This type of frequency response can be useful for people with hearing recruitment.

Example 7

The in-canal oscillator from Example 4 can use the control coil as a measurement device by measuring the amplitude of the armature's oscillations. The armature is magnetized by the magnets and the main coil, therefore its movement inside the center of the control coil will induce measurable currents detected by the sound processing circuitry. This is particularly useful in feedback detection, quality assessment, fitting and AI-driven adjustment of power output.

Figure 26:
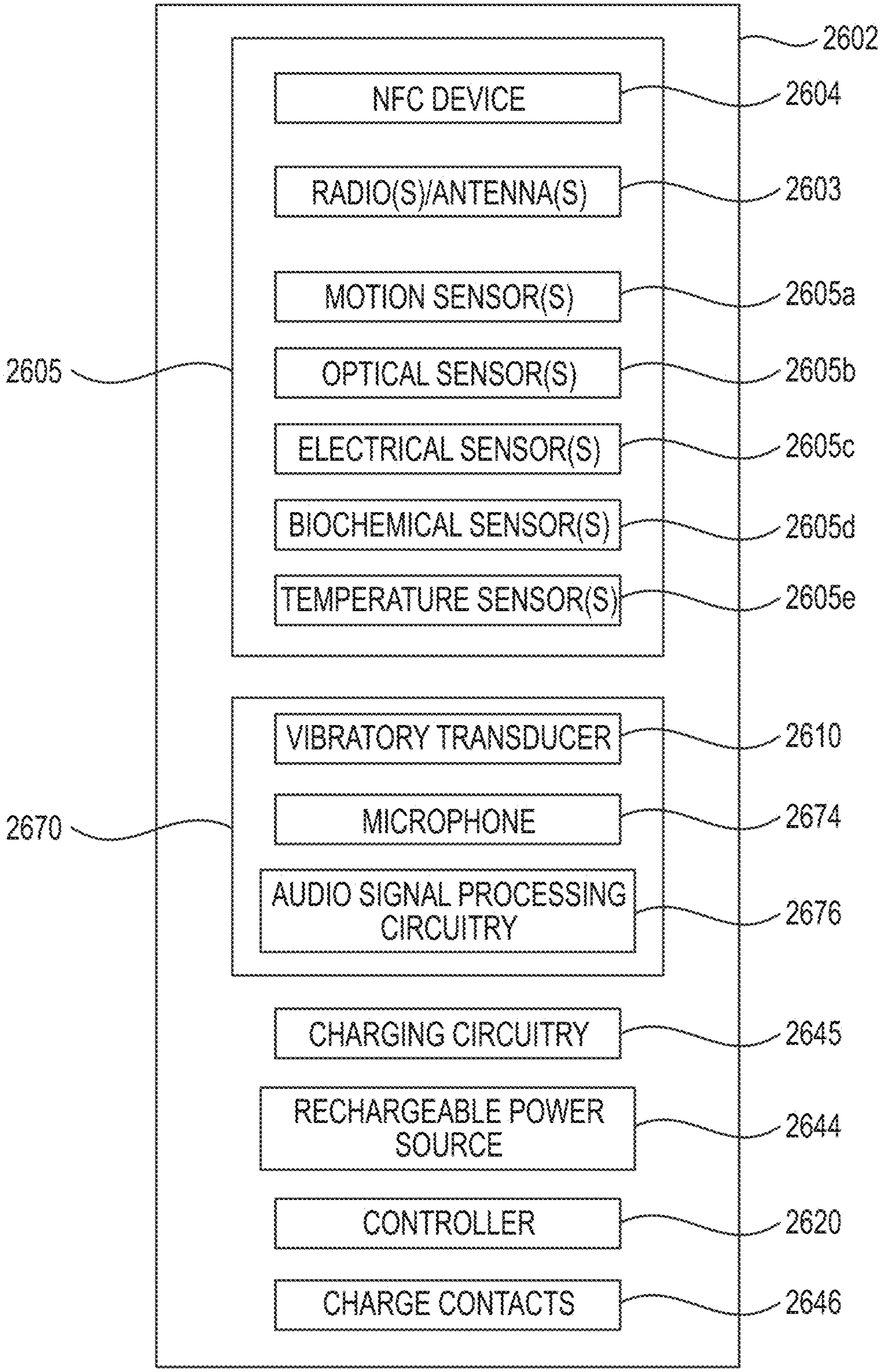
FIG. 26 is a block diagram of a representative ear-wearable electronic device which be configured to incorporate a vibratory transducer in accordance with any of the embodiments disclosed herein.

FIG. 26 is a block diagram of a representative ear-wearable electronic device 2602 which be configured to incorporate a vibratory transducer in accordance with any of the embodiments disclosed herein. The device 2602 is representative of a wide variety of electronic devices configured to be deployed at least partially in an ear canal of a wearer. The device 2602 need not include all components shown in FIG. 26, but can include selected components according to different design objectives.

The device 2602 can include an NFC device 2604 and/or one or more RF radios/antennae 2603 (e.g., compliant with a Bluetooth® or IEEE 802.11 protocol). The RF radios/antennae 2603 can be configured to effect communications with an external electronic device, communication system, and/or the cloud. Data acquired or generated by the ear-wearable electronic device 2602 (e.g., sensor data) can be communicated to a smartphone, laptop, network server, and/or the cloud (e.g., a cloud server and/or processor). The device 2602 includes a controller 2620, and preferably includes a rechargeable power source 2644, charging circuitry 2645, and charge contacts 2646.

The device 2602 can include one or more sensors 2605 of a type previously described. For example, the device 2602 can include one or more of a motion sensor 2605*a*, one or more optical sensors 2605*b*, one or more electrode-based sensors 2605*c*, one or more chemical or biochemical sensors 2605*d*, and/or one or more temperature sensors 2605*e*.

The device 2602 can be configured as a hearing device or a hearable which includes an audio processing facility 2670. The audio processing facility 2670 includes audio signal processing circuitry 2676 operatively coupled to a vibratory transducer 2610 of a type previously described and to one or more microphones 2674. In some embodiments, the audio signal processing circuitry 2676 and/or microphone(s) 2674 can be situated in a separate housing (e.g., a housing of a behind-the-ear component).

The device 2602 can be implemented as a hearing assistance device that can aid a person with impaired hearing. For example, the device 2602 can be implemented as a monaural hearing aid or a pair of devices 2602 can be implemented as a binaural hearing aid system, in which case left and right devices 2602 are deployable with corresponding left and right wearable sensor units. The monaural device 2602 or a pair of devices 2602 can be configured to effect bi-directional communication (e.g., wireless communication) of data with an external source, such as a remote server via the Internet or other communication infrastructure. The device or devices 2602 can be configured to receive streaming audio (e.g., digital audio data or files) from an electronic or digital source. Representative electronic/digital sources (e.g., accessory devices) include an assistive listening system, a streaming device (e.g., a TV streamer or audio streamer), a remote microphone, a radio, a smartphone, a laptop, a cell phone/entertainment device (CPED) or other electronic device that serves as a source of digital audio data, control and/or settings data or commands, and/or other types of data files.

The controller 2620 shown in FIG. 26 can include one or more processors or other logic devices. For example, the controller 2620 can be representative of any combination of one or more logic devices (e.g., multi-core processor, digital signal processor (DSP), microprocessor, programmable controller, general-purpose processor, special-purpose processor, hardware controller, software controller, a combined hardware and software device) and/or other digital logic circuitry (e.g., ASICs, FPGAs), and software/firmware configured to implement the functionality disclosed herein. The controller 2620 can incorporate or be coupled to various analog components (e.g., analog front-end), ADC and DAC components, and Filters (e.g., FIR filter, Kalman filter). The controller 2620 can incorporate or be coupled to memory. The memory can include one or more types of memory, including ROM, RAM, SDRAM, NVRAM, EEPROM, and FLASH, for example.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of" "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. An ear-wearable electronic device, comprising:
- a housing configured for deployment at least partially within an ear canal of a wearer;
- sound processing circuitry; and
- a vibratory transducer disposed in the housing and coupled to the sound processing circuitry, the vibratory transducer comprising an oscillator arrangement disposed in a sealed case, the vibratory transducer configured to generate output signals in the form of audible sound transmissible via air conduction to an ear drum of the wearer and vibratory signals for stimulating a cochlea of the wearer via transcranial bone conduction.

2. The device according to claim 1, wherein the sealed case of the oscillator arrangement is devoid of a sound output port.

3. The device according to claim 1, wherein the sealed case of the oscillator arrangement is airtight.

4. The device according to claim 1, wherein the vibratory transducer is configured to generate output signals having frequencies of up to at least 20 KHz.

5. The device according to claim 1, wherein the oscillator arrangement has a resonance frequency lower than frequencies of the output signals generated by the vibratory transducer.

6. The device according to claim 1, comprising:
an electronic hardware platform disposed in the sealed case;
one or more sensors disposed in or on the sealed case and coupled to the electronic hardware platform; and/or
one or more sensors disposed in or on the housing and coupled to the electronic hardware platform via sealed access ports of the sealed case.

7. The device according to claim 1, wherein the oscillator arrangement comprises an orthogonal oscillator arrangement.

8. The device according to claim 1, wherein the oscillator arrangement comprises a radial oscillator arrangement.

9. The device according to claim 1, wherein the oscillator arrangement comprises a swing oscillator arrangement.

10. An ear-wearable electronic device, comprising:
a housing configured for deployment at least partially within an ear canal of a wearer;
sound processing circuitry; and
a vibratory transducer disposed in the housing and coupled to the sound processing circuitry, the vibratory transducer comprising:
a sealed case and an oscillator arrangement disposed in the sealed case, the oscillator arrangement comprising:
a magnet arrangement comprising a first magnet and a second magnet spaced apart from the first magnet;
a coil arrangement comprising a main coil;
a weight ballast; and
an armature positioned between the first and second magnets and passing through the main coil, the armature comprising a first end connected to the sealed case at a hard joint and a second end connected to the weight ballast;
wherein the oscillator arrangement is suspended by the armature at the hard joint.

11. The device according to claim 10, wherein the oscillator arrangement is mechanically isolated from the sealed case except at the hard joint.

12. The device according to claim 10, wherein a frequency response of the oscillator arrangement is dependent on a mass of the weight ballast and a length or a shape of the armature.

13. The device according to claim 10, wherein the armature has one of an L-shape, a zig-zag shape, a spiral shape, a U-shape, and a meandering shape.

14. The device according to claim 10, wherein:
the main coil is operably coupled to a driver of the sound processing circuitry; and
the coil arrangement comprises a control coil configured to dampen undesired frequencies.

15. The device according to claim 10, wherein the armature is configured to receive induced magnetic currents of opposite phases which cancel or attenuate each other and of which a resultant magnetic field interacts with magnetic fields from the first and second magnets.

16. The device according to claim 10, wherein:
the housing comprises a distal end and an opposing proximal end, the distal end directed to an ear drum of the wearer when the device is deployed in the wearer's ear canal; and
solid material encompasses the sealed case and is disposed between the sealed case and the distal end of the housing.

17. The device according to claim 10, wherein the vibratory transducer is configured to generate output signals in the form of audible sound transmissible via air conduction to an ear drum of the wearer and vibratory signals for stimulating a cochlea of the wearer via transcranial bone conduction.

18. The device according to claim 10, wherein the sealed case of the oscillator arrangement is airtight and devoid of a sound output port.

19. The device according to claim 10, wherein the vibratory transducer is configured to generate output signals having frequencies of up to at least 20 kHz.

20. A method implemented by an ear-wearable electronic device, the method comprising:
receiving or generating electrical signals indicative of sound; and
generating, by an in-canal vibratory transducer from within a sealed case devoid of a sound output port, and in response to the electrical signals, output signals in the form of audible sound transmissible via air conduction to an ear drum and vibratory signals for stimulating a cochlea via transcranial bone conduction.

21. The method according to claim 20, comprising suspending an oscillator arrangement of the in-canal vibratory transducer from a wall of the sealed case within which the in-canal vibratory transducer is disposed.

22. The method according to claim 20, wherein the in-canal vibratory transducer is configured to generate output signals having frequencies of up to at least 20 kHz.

* * * * *